(12) United States Patent
Miller et al.

(10) Patent No.: US 11,176,211 B2
(45) Date of Patent: *Nov. 16, 2021

(54) DETERMINING FEASIBLE ITINERARY SOLUTIONS

(71) Applicant: Amgine Technologies (US), Inc., Dover, DE (US)

(72) Inventors: Naomi Liora Miller, New York City, NY (US); Harold Roy Miller, Toronto (CA); Warren Stableford, Burlington (CA)

(73) Assignee: Amgine Technologies (US), Inc., Dover, DE (US)

( * ) Notice: Subject to any disclaimer, the term of this patent is extended or adjusted under 35 U.S.C. 154(b) by 452 days.

This patent is subject to a terminal disclaimer.

(21) Appl. No.: 16/275,133

(22) Filed: Feb. 13, 2019

(65) Prior Publication Data

US 2019/0179863 A1  Jun. 13, 2019

Related U.S. Application Data

(63) Continuation of application No. 15/595,795, filed on May 15, 2017, now Pat. No. 10,210,270, which is a
(Continued)

(51) Int. Cl.
*G06F 16/00* (2019.01)
*G06F 16/9535* (2019.01)
(Continued)

(52) U.S. Cl.
CPC ........ *G06F 16/9535* (2019.01); *G06F 16/243* (2019.01); *G06F 40/30* (2020.01); *G06Q 10/02* (2013.01)

(58) Field of Classification Search
CPC .... G06F 16/9535; G06F 40/30; G06F 16/243; G06F 16/9537; G06F 16/29; G06Q 10/02
See application file for complete search history.

(56) References Cited

U.S. PATENT DOCUMENTS 5,557,524 A   9/1996 Maki
5,797,127 A   8/1998 Walker et al.
(Continued)

FOREIGN PATENT DOCUMENTS

CA   2830228 C    8/2017
CA   28302240 C   12/2017
(Continued)

OTHER PUBLICATIONS

"Office Action," Canadian Patent Application No. 2944652, dated Dec. 30, 2019, 5 pages.
(Continued)

*Primary Examiner* — Noosha Arjomandi
(74) *Attorney, Agent, or Firm* — Dickinson Wright PLLC

(57) ABSTRACT

A method for translating user requests into itinerary solutions is disclosed. The method may commence with receiving an itinerary request associated with one or more passengers. The method may continue with parsing the itinerary request to create an itinerary network associated with the itinerary request. The itinerary network may include at least two or more nodes and dependencies between two or more nodes. Upon the parsing, a topology of the itinerary network may be created. The method may include processing the itinerary network using the topology to create a plurality of tuples. The plurality of tuples may be analyzed. The method may continue with determining feasible itinerary solutions based on the analysis. The feasible itinerary solutions may be ranked. The method may further include presenting, to the one or more passengers, at least one itinerary solution selected from the feasible itinerary solutions based on the ranking.

19 Claims, 9 Drawing Sheets

Related U.S. Application Data continuation of application No. 15/069,791, filed on Mar. 14, 2016, now Pat. No. 9,659,099, which is a continuation-in-part of application No. 13/419,989, filed on Mar. 14, 2012, now Pat. No. 9,286,629.

(60) Provisional application No. 61/452,633, filed on Mar. 14, 2011.

(51) Int. Cl.
*G06F 16/242* (2019.01)
*G06Q 10/02* (2012.01)
*G06F 40/30* (2020.01)

(56) References Cited

U.S. PATENT DOCUMENTS

| | | | |
|---|---|---|---|
| 5,832,452 | A | 11/1998 | Schneider et al. |
| 5,948,040 | A | 9/1999 | DeLorme et al. |
| 6,059,724 | A | 5/2000 | Campell et al. |
| 6,275,808 | B1 | 8/2001 | DeMarcken |
| 6,307,572 | B1* | 10/2001 | DeMarcken ........... G06Q 10/02 715/703 |
| 6,477,520 | B1 | 11/2002 | Malaviya et al. |
| 6,553,310 | B1 | 4/2003 | Lopke |
| 6,795,710 | B1 | 9/2004 | Creemer |
| 7,092,892 | B1 | 8/2006 | Sobalvarro et al. |
| 7,219,073 | B1 | 5/2007 | Taylor et al. |
| 7,286,998 | B2 | 10/2007 | Sauser et al. |
| 7,302,398 | B2 | 11/2007 | Ban et al. |
| 7,680,777 | B2* | 3/2010 | Poston ................ G06F 16/9537 707/999.003 |
| 7,860,808 | B2 | 12/2010 | Peters |
| 7,912,734 | B2 | 3/2011 | Kil |
| 7,979,457 | B1 | 7/2011 | Garman |
| 7,983,956 | B1 | 7/2011 | Goel |
| 8,005,685 | B1 | 8/2011 | Bird |
| 8,035,511 | B2 | 10/2011 | Weaver et al. |
| 8,165,920 | B2 | 4/2012 | Goel |
| 8,224,665 | B2 | 7/2012 | Morris |
| 8,332,247 | B1 | 12/2012 | Bailey et al. |
| 8,510,133 | B2 | 8/2013 | Peak et al. |
| 8,600,784 | B1 | 12/2013 | Ivey et al. |
| 8,600,830 | B2* | 12/2013 | Hoffberg ........... G06Q 30/0282 705/26.3 |
| 8,631,007 | B1 | 1/2014 | Blandford et al. |
| 8,762,160 | B2 | 6/2014 | Lulla |
| 9,031,853 | B2 | 5/2015 | Bartfeld et al. |
| 9,043,151 | B2 | 5/2015 | Cai et al. |
| 9,286,629 | B2 | 3/2016 | Miller et al. |
| 9,449,151 | B2 | 9/2016 | Etchegoyen |
| 9,659,099 | B2 | 5/2017 | Miller et al. |
| 9,946,839 | B1* | 4/2018 | Wilson ................ G06F 16/9535 |
| 10,041,803 | B2 | 8/2018 | Miller et al. |
| 10,078,855 | B2 | 9/2018 | Miller et al. |
| 10,210,270 | B2 | 2/2019 | Miller et al. |
| 10,275,810 | B2 | 4/2019 | Miller et al. |
| 10,282,797 | B2 | 5/2019 | Valverde, Jr. et al. |
| 2001/0044788 | A1 | 11/2001 | Demir et al. |
| 2002/0069133 | A1 | 6/2002 | Currie et al. |
| 2002/0082877 | A1 | 6/2002 | Schiff et al. |
| 2002/0147619 | A1 | 10/2002 | Floss et al. |
| 2002/0178034 | A1 | 11/2002 | Gardner et al. |
| 2003/0018499 | A1 | 1/2003 | Miller et al. |
| 2003/0023463 | A1 | 1/2003 | Dombroski et al. |
| 2003/0050846 | A1 | 3/2003 | Rodon |
| 2003/0055690 | A1 | 3/2003 | Garback |
| 2003/0055772 | A1 | 3/2003 | Goldstein |
| 2003/0135458 | A1 | 7/2003 | Tadano et al. |
| 2003/0177044 | A1 | 9/2003 | Sokel et al. |
| 2003/0217052 | A1 | 11/2003 | Rubenczyk et al. |
| 2004/0002876 | A1 | 1/2004 | Sommers et al. |
| 2004/0044516 | A1 | 3/2004 | Kennewick et al. |
| 2004/0078213 | A1 | 4/2004 | Brice et al. |
| 2004/0111255 | A1 | 6/2004 | Huerta et al. |
| 2004/0220854 | A1 | 11/2004 | Postrel |
| 2004/0249680 | A1 | 12/2004 | Liew et al. |
| 2005/0033614 | A1 | 2/2005 | Lettovsky et al. |
| 2005/0038644 | A1 | 2/2005 | Napper et al. |
| 2005/0043940 | A1 | 2/2005 | Elder |
| 2005/0108068 | A1 | 5/2005 | Marcken et al. |
| 2005/0220278 | A1 | 10/2005 | Zirngibl |
| 2005/0267651 | A1 | 12/2005 | Arango et al. |
| 2005/0288973 | A1 | 12/2005 | Taylor et al. |
| 2006/0106655 | A1* | 5/2006 | Lettovsky ........... G06Q 10/025 705/6 |
| 2006/0178931 | A1 | 8/2006 | Horn |
| 2006/0241983 | A1 | 10/2006 | Viale et al. |
| 2006/0247954 | A1 | 11/2006 | Hunt |
| 2006/0265508 | A1 | 11/2006 | Angel et al. |
| 2006/0285662 | A1 | 12/2006 | Yin et al. |
| 2006/0293930 | A1 | 12/2006 | Rodgers et al. |
| 2007/0073563 | A1 | 3/2007 | Dourthe et al. |
| 2007/0100962 | A1* | 5/2007 | Barth ................. G06F 16/9535 709/217 |
| 2007/0106497 | A1 | 5/2007 | Ramsey et al. |
| 2007/0106536 | A1 | 5/2007 | Moore |
| 2007/0143154 | A1 | 6/2007 | Ashby et al. |
| 2007/0156469 | A1 | 7/2007 | Bird et al. |
| 2007/0168245 | A1 | 7/2007 | de Marcken et al. |
| 2007/0174350 | A1 | 7/2007 | Pell et al. |
| 2007/0192186 | A1 | 8/2007 | Greene et al. |
| 2007/0198442 | A1 | 8/2007 | Horn |
| 2007/0203735 | A1 | 8/2007 | Ashton |
| 2007/0208503 | A1* | 9/2007 | Harnsberger ......... G09B 29/10 701/532 |
| 2007/0260495 | A1 | 11/2007 | Mace et al. |
| 2007/0276595 | A1 | 11/2007 | Lewinson et al. |
| 2007/0294149 | A1 | 12/2007 | Lu et al. |
| 2008/0021748 | A1 | 1/2008 | Bay et al. |
| 2008/0046274 | A1 | 2/2008 | Geelen et al. |
| 2008/0052217 | A1 | 2/2008 | Etkin |
| 2008/0059454 | A1 | 3/2008 | Andrieu |
| 2008/0091525 | A1 | 4/2008 | Kretz |
| 2008/0091557 | A1 | 4/2008 | Cella et al. |
| 2008/0103949 | A1 | 5/2008 | Lobana et al. |
| 2008/0109232 | A1 | 5/2008 | Musgrove et al. |
| 2008/0114623 | A1 | 5/2008 | Berthaud et al. |
| 2008/0120306 | A1 | 5/2008 | Panabaker et al. |
| 2008/0201178 | A1 | 8/2008 | Vizitei |
| 2008/0319803 | A1 | 12/2008 | Heyraud et al. |
| 2009/0005650 | A1 | 1/2009 | Angell et al. |
| 2009/0006143 | A1 | 1/2009 | Orttung et al. |
| 2009/0048876 | A1 | 2/2009 | Bonissone et al. |
| 2009/0063359 | A1 | 3/2009 | Connors |
| 2009/0070322 | A1 | 3/2009 | Salvetti et al. |
| 2009/0112639 | A1 | 4/2009 | Robinson |
| 2009/0157312 | A1 | 6/2009 | Black et al. |
| 2009/0157664 | A1* | 6/2009 | Wen ...................... G06Q 50/14 |
| 2009/0177651 | A1 | 7/2009 | Takamatsu et al. |
| 2009/0210262 | A1 | 8/2009 | Rines et al. |
| 2009/0216633 | A1 | 8/2009 | Whitsett et al. |
| 2009/0234681 | A1 | 9/2009 | Champernowne |
| 2009/0240517 | A1 | 9/2009 | Pelter |
| 2009/0319305 | A1 | 12/2009 | Weissert et al. |
| 2009/0327148 | A1 | 12/2009 | Kamar et al. |
| 2010/0010841 | A1 | 1/2010 | Cooper et al. |
| 2010/0010978 | A1 | 1/2010 | Carapella et al. |
| 2010/0030594 | A1 | 2/2010 | Swart |
| 2010/0082241 | A1 | 4/2010 | Trivedi |
| 2010/0153292 | A1 | 6/2010 | Zheng et al. |
| 2010/0217680 | A1 | 8/2010 | Fusz et al. |
| 2010/0217723 | A1 | 8/2010 | Sauerwein, Jr. et al. |
| 2010/0317420 | A1* | 12/2010 | Hoffberg ............... G07F 17/323 463/1 |
| 2010/0318386 | A1 | 12/2010 | Vaughan et al. |
| 2010/0324927 | A1 | 12/2010 | Tinsley |
| 2011/0004513 | A1* | 1/2011 | Hoffberg ........... G06Q 30/0282 705/14.1 |
| 2011/0046989 | A1 | 2/2011 | Crean et al. |
| 2011/0093361 | A1 | 4/2011 | Morales |
| 2011/0125578 | A1 | 5/2011 | Alspector et al. |
| 2011/0137766 | A1 | 6/2011 | Rasmussen et al. |
| 2011/0153373 | A1 | 6/2011 | Dantzig et al. |

(56) References Cited

U.S. PATENT DOCUMENTS

| | | |
|---|---|---|
| 2011/0167003 A1 | 7/2011 | Nice et al. |
| 2011/0231182 A1 | 9/2011 | Weider et al. |
| 2011/0246246 A1 | 10/2011 | Johnson |
| 2011/0295692 A1 | 12/2011 | Zivkovic et al. |
| 2011/0307241 A1 | 12/2011 | Waibel et al. |
| 2011/0312870 A1 | 12/2011 | Beatty |
| 2012/0036158 A1 | 2/2012 | Cahill et al. |
| 2012/0054001 A1 | 3/2012 | Zivkovic et al. |
| 2012/0059679 A1 | 3/2012 | de Marcken et al. |
| 2012/0209517 A1 | 8/2012 | Li et al. |
| 2012/0233207 A1 | 9/2012 | Mohajer |
| 2012/0239440 A1 | 9/2012 | Miller et al. |
| 2012/0239443 A1 | 9/2012 | Miller et al. |
| 2012/0239455 A1 | 9/2012 | Crean et al. |
| 2012/0239584 A1 | 9/2012 | Yariv et al. |
| 2012/0239669 A1 | 9/2012 | Miller et al. |
| 2012/0259667 A1 | 10/2012 | Pelissier et al. |
| 2012/0265598 A1 | 10/2012 | Krone |
| 2012/0330982 A1 | 12/2012 | Arnaud et al. |
| 2013/0041696 A1 | 2/2013 | Richard |
| 2013/0041902 A1 | 2/2013 | Swann et al. |
| 2013/0054375 A1 | 2/2013 | Sy et al. |
| 2013/0073323 A1 | 3/2013 | Zacharia et al. |
| 2013/0073325 A1 | 3/2013 | Ross |
| 2013/0090959 A1 | 4/2013 | Kvamme et al. |
| 2013/0096965 A1 | 4/2013 | Pappas et al. |
| 2013/0132129 A1 | 5/2013 | Fox et al. |
| 2013/0151291 A1 | 6/2013 | Salway |
| 2013/0158821 A1 | 6/2013 | Ricci |
| 2013/0159023 A1 | 6/2013 | Srinivas et al. |
| 2013/0166329 A1 | 6/2013 | Arnoux-Prost et al. |
| 2013/0198036 A1 | 8/2013 | Pappas et al. |
| 2013/0304349 A1 | 11/2013 | Davidson |
| 2013/0339105 A1 | 12/2013 | Russell et al. |
| 2014/0012659 A1 | 1/2014 | Yan |
| 2014/0019176 A1 | 1/2014 | Mandelbaum |
| 2014/0025540 A1 | 1/2014 | Hendrickson |
| 2014/0074746 A1 | 3/2014 | Wang |
| 2014/0081793 A1* | 3/2014 | Hoffberg .............. G06Q 30/0282 705/26.3 |
| 2014/0089020 A1 | 3/2014 | Murphy |
| 2014/0089036 A1 | 3/2014 | Chidlovskii |
| 2014/0089101 A1 | 3/2014 | Meller |
| 2014/0114705 A1 | 4/2014 | Bashvitz et al. |
| 2014/0156411 A1 | 6/2014 | Murgai |
| 2014/0229102 A1 | 8/2014 | Bapna et al. |
| 2014/0257949 A1 | 9/2014 | Gishen |
| 2014/0279196 A1 | 9/2014 | Wilson et al. |
| 2014/0330605 A1 | 11/2014 | Connolly et al. |
| 2014/0330606 A1 | 11/2014 | Paget et al. |
| 2014/0330621 A1 | 11/2014 | Nichols et al. |
| 2014/0337063 A1 | 11/2014 | Nelson et al. |
| 2015/0012309 A1 | 1/2015 | Buchheim et al. |
| 2015/0012467 A1 | 1/2015 | Greystoke et al. |
| 2015/0046201 A1 | 2/2015 | Miller et al. |
| 2015/0066594 A1 | 3/2015 | Li et al. |
| 2015/0066830 A1 | 3/2015 | Wilson et al. |
| 2015/0168169 A1* | 6/2015 | Caceres ................ G08G 1/0112 701/537 |
| 2015/0193583 A1 | 7/2015 | McNair et al. |
| 2015/0227633 A1 | 8/2015 | Shapira |
| 2015/0235478 A1 | 8/2015 | Blandin et al. |
| 2015/0242927 A1 | 8/2015 | Will et al. |
| 2015/0278970 A1 | 10/2015 | Valverde, Jr. et al. |
| 2015/0356262 A1 | 12/2015 | Liebovitz et al. |
| 2016/0048928 A1 | 2/2016 | Davis et al. |
| 2016/0125559 A1 | 5/2016 | Shekou |
| 2016/0162871 A1* | 6/2016 | Lee .......................... G06Q 10/02 705/66 |
| 2016/0196271 A1 | 7/2016 | Miller et al. |
| 2016/0202073 A1* | 7/2016 | Claycomb ............ G08B 25/016 701/400 |
| 2016/0203422 A1* | 7/2016 | Demarchi ................ G06F 16/29 705/6 |
| 2016/0232626 A1* | 8/2016 | Geraci ................... G06Q 50/14 |
| 2016/0258767 A1* | 9/2016 | Nevrekar ............ G06F 16/9537 |
| 2016/0364815 A1 | 12/2016 | Miller et al. |
| 2016/0370197 A1 | 12/2016 | Miller et al. |
| 2016/0371799 A1 | 12/2016 | Miller et al. |
| 2016/0379142 A1* | 12/2016 | Valverde, Jr. ........ G06Q 10/025 705/6 |
| 2017/0132740 A1 | 5/2017 | Waysbort et al. |
| 2017/0154353 A1 | 6/2017 | Ralston |
| 2017/0293722 A1 | 10/2017 | Valverde, Jr. et al. |
| 2017/0316103 A1 | 11/2017 | Miller et al. |
| 2018/0336642 A1 | 11/2018 | Miller |
| 2018/0347995 A1 | 12/2018 | Valverde, Jr. et al. |
| 2019/0012712 A1 | 1/2019 | Miller et al. |
| 2019/0122315 A1 | 4/2019 | Valverde, Jr. et al. |
| 2019/0179863 A1* | 6/2019 | Miller ................. G06F 16/9535 |
| 2019/0251643 A1 | 8/2019 | Valverde, Jr. et al. |
| 2019/0332921 A1* | 10/2019 | Rodriguez ............ H04L 9/0643 |
| 2020/0027039 A1 | 1/2020 | Miller et al. |

FOREIGN PATENT DOCUMENTS

| | | |
|---|---|---|
| WO | WO2012125742 A2 | 9/2012 |
| WO | WO2012125753 A2 | 9/2012 |
| WO | WO2012125761 A1 | 9/2012 |
| WO | WO2015021180 A1 | 2/2015 |
| WO | WO2015153776 A1 | 10/2015 |
| WO | WO2016201134 A1 | 12/2016 |
| WO | WO2016205076 A1 | 12/2016 |
| WO | WO2016205280 A1 | 12/2016 |
| WO | WO2016209679 A1 | 12/2016 |
| WO | WO2017180483 A1 | 10/2017 |

OTHER PUBLICATIONS

Non-final Office Action and Notice of References Cited dated Jun. 5, 2018 in U.S. Appl. No. 15/595,795 (14 pages).

Non-final Office Action and Notice of References Cited dated Mar. 11, 2015 in U.S. Appl. No. 13/420,433 (9 pages).

Non-final Office Action and Notice of References Cited dated Feb. 26, 2016 in U.S. Appl. No. 13/420,433 (11 pages).

Non-final Office Action and Notice of References Cited dated Dec. 16, 2013 in U.S. Appl. No. 13/419,989 (16 pages).

Non-final Office Action and Notice of References Cited dated Dec. 5, 2014 in U.S. Appl. No. 13/419,989 (14 pages).

Notices of Allowance and References Cited dated Dec. 18, 2015 in U.S. Appl. No. 13/419,989 (15 pages).

Non-final Office Action and Notice of References Cited dated Oct. 21, 2014 in U.S. Appl. No. 13/420,179 (10 pages).

Non-final Office Action and Notice of References Cited dated Aug. 12, 2015 in U.S. Appl. No. 14/750,841 (15 pages).

Non-final Office Action and Notice of References Cited dated Aug. 14, 2015 in U.S. Appl. No. 14/676,302 (19 pages).

Final Office Action and Notice of References Cited dated Apr. 6, 2016 in U.S. Appl. No. 14/676,302 (26 pages).

Final Office Action and Notice of References Cited dated Jul. 11, 2016 in U.S. Appl. No. 13/420,433 (12 pages).

Non-final Office Action and Notice of References Cited dated Sep. 20, 2016 in U.S. Appl. No. 14/453,420 (29 pages).

Non-final Office Action and Notice of References Cited dated Nov. 30, 2016 in U.S. Appl. No. 14/676,302 (20 pages).

Non-final Office Action and Notice of References Cited dated Dec. 29, 2016 in U.S. Appl. No. 14/750,841 (16 pages).

Non-final Office Action and Notice of References Cited dated Jul. 13, 2016 in U.S. Appl. No. 15/069,791 (12 pages).

Non-final Office Action and Notice of References Cited dated Jun. 22, 2016 in U.S. Appl. No. 13/420,179 (13 pages).

Notices of Allowance and References Cited dated Dec. 27, 2018 in U.S. Appl. No. 13/420,179 (13 pages).

Non-final Office Action and Notice of References Cited dated Apr. 24, 2018 in U.S. Appl. No. 14/676,302 (26 pages).

Non-final Office Action and Notice of References Cited dated Feb. 7, 2019 in U.S. Appl. No. 14/750,841 (18 pages).

(56) References Cited

OTHER PUBLICATIONS

Non-final Office Action and Notice of References Cited dated Mar. 13, 2020 in U.S. Appl. No. 14/750,841 (25 pages).
Non-final Office Action and Notice of References Cited dated Aug. 24, 2018 in U.S. Appl. No. 15/178,064 (30 pages).
Final Office Action and Notice of References Cited dated Feb. 19, 2019 in U.S. Appl. No. 15/178,064 (33 pages).
Non-final Office Action and Notice of References Cited dated Oct. 7, 2019 in U.S. Appl. No. 15/178,064 (44 pages).
Non-final Office Action and Notice of References Cited dated Sep. 26, 2017 in U.S. Appl. No. 15/178,453 (12 pages).
Non-final Office Action and Notice of References Cited dated Sep. 16, 2019 in U.S. Appl. No. 16/055,767 (7 pages).
Final Office Action and Notice of References Cited dated Apr. 18, 2017 in U.S. Appl. No. 14/453,420 (27 pages).
Non-final Office Action dated Mar. 9, 2018 in U.S. Appl. No. 14/453,420 (38 pages).
Final Office Action and Notice of References Cited dated Aug. 27, 2018 in U.S. Appl. No. 14/453,420 (45 pages).
Non-final Office Action and Notice of References Cited dated Jan. 7, 2019 in U.S. Appl. No. 14/453,420 (47 pages).
Final Office Action and Notice of References Cited dated Mar. 29, 2019 in U.S. Appl. No. 14/453,420 (44 pages).
Non-final Office Action and Notice of References Cited dated Jul. 12, 2018 in U.S. Appl. No. 15/183,620 (14 pages).
Non-Final Office Action and Notice of References Cited dated Nov. 29, 2018 in U.S. Appl. No. 15/183,620 (17 pages).
Non-final Office Action and Notice of References Cited dated May 22, 2019 in U.S. Appl. No. 15/183,620 (16 pages).
Non-final Office Action and Notice of References Cited dated Apr. 17, 2019 in U.S. Appl. No. 15/482,619 (42 pages).
Non-final Office Action and Notice of References Cited dated Apr. 14, 2020 in U.S. Appl. No. 15/979,275 (14 pages).
Non-final Office Action and Notice of References Cited dated May 28, 2020 in U.S. Appl. No. 16/142,834 (33 pages).
Final Office Action and Notice of References Cited dated Oct. 23, 2020 in U.S. Appl. No. 14/750,841 (21 pages).
"International Search Report" and "Written Opinion," Patent Cooperation Treaty application No. PCT/US2012/029121, dated Jun. 15, 2012, 8 pages.
"International Search Report" and "Written Opinion," Patent Cooperation Treaty application No. PCT/US2012/029098, dated Jun. 7, 2012, 6 pages.
"International Search Report" and "Written Opinion," Patent Cooperation Treaty application No. PCT/US2012/029112, dated Mar. 14, 2013, 6 pages.
"International Search Report" and "Written Opinion," Patent Cooperation Treaty application No. PCT/US2014/049979, dated Nov. 24, 2014, 9 pages.
United Hub. "FareLock: An Opportunity to Lock in Your Ticket Price for up to Seven Days." United Hub. Aug. 17, 2012. Retrieved on Oct. 17, 2014 from Internet URL <https://hub.united.com/en-us/news/products-services/pages/farelock-lets-you-lock-in-your-ticket-price.aspx>, 3 pages.
Mackenzie, Scott. "Two Services Help You Lock in a Good Deal on Airfare." Hack My Trip. Apr. 2014. Retrieved on Oct. 17, 2014 from Internet URL <http://hackmytrip.com/2014/04/two-services-help-lock-good-deal-airfare/>, 9 pages.
Boardman, AI. "Options Away." Vimeo. May 24, 2013. Retrieved on Oct. 17, 2014 from Internet URL <http://vimeo.com/66936261>, 2 pages.
"International Search Report" and "Written Opinion," Patent Cooperation Treaty application No. PCT/US2015/023901, dated Jul. 2, 2015, 10 pages.
"Office Action" Canadian Patent Application No. 2830228 dated Feb. 26, 2016, 3 pages.
"Office Action," Canadian Patent Application No. 2830224, dated May 18, 2016, 6 pages.
"Office Action," Canadian Patent Application No. 2830229, dated May 19, 2016, 4 pages.
"International Search Report" and "Written Opinion," Patent Cooperation Treaty application No. PCT/US2016/037555, dated Jul. 11, 2016, 13 pages.
"International Search Report" and "Written Opinion," Patent Cooperation Treaty application No. PCT/US2016/036760, dated Sep. 1, 2016, 12 pages.
"International Search Report" and "Written Opinion," Patent Cooperation Treaty application No. PCT/US2016/037503, dated Sep. 9, 2016, 10 pages.
"International Search Report" and "Written Opinion," Patent Cooperation Treaty application No. PCT/US2016/036749, dated Sep. 27, 2016, 13 pages.
"Notice of Allowance," Canadian Patent Application No. 2830228, dated Jan. 12, 2017, 1 page.
"Notice of Allowance," Canadian Patent Application No. 2830224, dated May 4, 2017, 1 page.
"Office Action," Canadian Patent Application No. 2830229, dated Apr. 28, 2017, 4 pages.
"International Search Report" and "Written Opinion," Patent Cooperation Treaty Application No. PCT/US2017/026708, dated Jul. 7, 2017, 13 pages.
Mayerowitz "Latest Airline Fee: $9 to Lock in Airfare," ABC News [online], Dec. 13, 2010 (retrieved on Dec. 21, 2018], Retrieved from the Internet: <URL:http://web.archive.org/web/20110122133909/http://abcnews.go.com/Travel/airline-fees-forgot-checked-bags-pay-lock-airfare/story?id=12385126> 8 pages.
"Office Action," Canadian Patent Application No. 2830229, dated Mar. 16, 2018, 5 pages.
Goddeau, David et al., "Galaxy: A Human-Language Interface to On-Line Travel Information," 3rd International Conference on Spoken Language Processing (ICSLP 94), Yokohama, Japan, Sep. 18-22, 1994, pp. 707-710.
Subramoni, Hari, "Topology-Aware MPI Communication and Scheduling for High Performance Computing Systens," Ohio State University, 2013, 151 pages.
Tablan, Valentin et al., "A Natural Language Query Interface to Structured Information," The Semantic Web: Research and Applications, ESWC 2008: Lecture Notes in Computer Science, vol. 5021, pp. 361-375.
United Airlines, "FareLock" webpage. Jul. 28, 2012. Retrieved from the Internet: <https://www.united.com/CMS/en-US/ products/travel/products/Pages/FareLock.aspx> (http://web.archive.org/web/20120728071904/https://www.united.com/CMS/en-US/products/travelproducts/Pages/FareLock.aspx> captured on Jul. 28, 2012 using Wayback Machine), 4 pages.
Federal Trade Commission, "Using Layaway Plans" webpage. Dec. 19, 2012. Retrieved from the Internet: <htttps://www.consumer.ftc.gov/articles/0128-using-layaway-plans> (<http://web.archive.org/web/20121219044435/htttps://www.consumer.ftc.gov/articles/0128-using-layaway-plans> captured on Dec. 19, 2012 using Wayback Machine), 2 pages.
"Office Action," Canadian Patent Application No. 2944652, dated Feb. 27, 2019, 5 pages.
"Office Action," Canadian Patent Application No. 2830229, dated Mar. 1, 2019, 3 pages.
"Office Action," Canadian Patent Application No. 3021147, dated Jun. 3, 2019, 5 pages.
"Office Action," Canadian Patent Application No. 2989325, dated Jul. 26, 2019, 6 pages.
Notice of Allowance and References Cited in U.S. Appl. No. 14/750,841, dated Mar. 23, 2021 (12 pages).
PR Newswire, "GetGoing Launches Multi-Supplier Hotel Merchandising Platform: BCD Travel Signs Multi-Year Agreement to Streamline Hotel Booking for Travel Management Companies", New York, PR Newswire Association LLC, Sep. 23, 2014 (2-3 pages).

\* cited by examiner

DETERMINING FEASIBLE ITINERARY SOLUTIONS

CROSS-REFERENCE TO RELATED APPLICATIONS

This application is a Continuation of U.S. patent application Ser. No. 15/595,795 filed on May 15, 2017, which is a Continuation of U.S. patent application Ser. No. 15/069,791 filed on Mar. 14, 2016 and issued on May 23, 2017 as U.S. Pat. No. 9,659,099, which is a continuation-in-part of U.S. patent application Ser. No. 13/419,989 filed on Mar. 14, 2012 and issued on Mar. 15, 2016 as U.S. Pat. No. 9,286,629, which claims the priority benefit of U.S. Provisional Patent Application No. 61/452,633, filed on Mar. 14, 2011. The disclosures of all of the above applications are incorporated by reference for all purposes.

TECHNICAL FIELD

The present disclosure relates to data processing and, more specifically, to translating user requests into itinerary solutions.

BACKGROUND

When searching for and booking flights and hotels, a travel consumer may utilize choice environments provided by online travel agencies and websites. These choice environments can provide travel-related information and advice on everything from destinations to hotels, related points of interest, and pricing data for a vast array of goods and services. However, a choice task of the travel consumer is often encumbered by information abundance and by legacy technology platforms that almost invariably complicate the consumer choice problem.

Moreover, travel agents and online travel agencies may need to sort through a plurality of records and manually select various options when selecting and scheduling the travel itinerary for the travel consumer. This process becomes particularly difficult when multiple databases are involved in developing complex itineraries, such as reserving multiple flights, hotels, cars, and restaurants, and for developing itineraries for groups of travel consumers. Furthermore, travel agents and online travel agencies may charge travel consumers for making changes to their itineraries and these changes can take from hours to days to take effect.

Additionally, a conventional travel reservation process does not typically involve taking into consideration previous travel itineraries associated with the travel consumer. Thus, searching for and selecting a travel itinerary is done without analysis of selections or preferences associated with previous requests.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to one example embodiment of the disclosure, a system for translating user requests into itinerary solutions is provided. The system may include a processor, a parser in communication with the processor, and a scheduler in communication with the processor. The processor may be operable to receive an itinerary request associated with one or more passengers. Furthermore, the processor may be operable to present at least one itinerary solution to the one or more passengers. The at least one itinerary solution may be selected from feasible itinerary solutions based on ranking.

The parser may be operable to parse the itinerary request to create an itinerary network associated with the itinerary request. The itinerary network may include at least two or more nodes and dependencies between two or more nodes. The scheduler may be operable to create a topology of the itinerary network. The topology may include at least an ordered list of the two or more nodes. The scheduler may be further operable to process the itinerary network using the topology to create a plurality of tuples, where a single node may correspond to a single tuple. The plurality of tuples may include at least flight tuples and hotel tuples. The scheduler may be operable to analyze the plurality of tuples based on the itinerary request and the dependencies between two or more nodes. Based on the analysis, the scheduler may determine the feasible itinerary solutions. Furthermore, the scheduler may be operable to rank the feasible itinerary solutions based on at least passenger preferences.

According to another example embodiment of the disclosure, a method for translating user requests into itinerary solutions is provided. The method may commence with receiving an itinerary request associated with one or more passengers. The method may continue with parsing the itinerary request to create an itinerary network associated with the itinerary request. The itinerary network may include at least two or more nodes and dependencies between two or more nodes. Upon the parsing, a topology of the itinerary network may be created. The topology may include at least an ordered list of the two or more nodes. The method may further include processing the itinerary network using the topology to create a plurality of tuples, where a single node may correspond to a single tuple. The plurality of tuples may include at least flight tuples and hotel tuples. Furthermore, the plurality of tuples may be analyzed based on the itinerary request and the dependencies between two or more nodes. The method may continue with determining feasible itinerary solutions based on the analysis. The method may further include ranking the feasible itinerary solutions based on passenger preferences. Furthermore, the method may include presenting at least one itinerary solution to the one or more passengers. The at least one itinerary solution may be selected from the feasible itinerary solutions based on the ranking.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
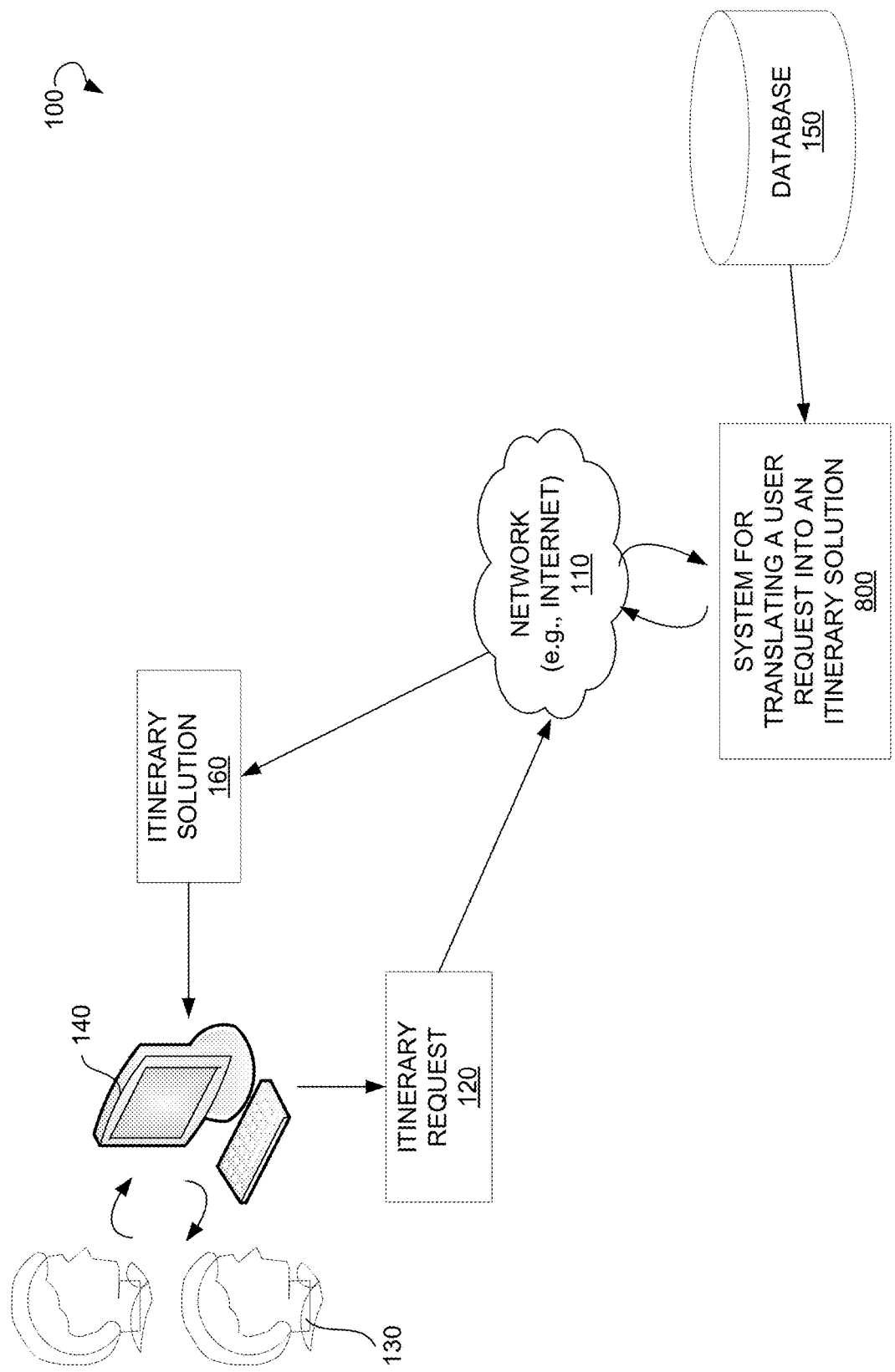
FIG. 1 illustrates an environment within which systems and methods for translating user requests into itinerary solutions can be implemented.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The disclosure relates to systems and methods for translating user requests into itinerary solutions. More specifically, upon receiving a user request, such as an itinerary request associated with one or more passengers, the itinerary request is forwarded to a parser. The parser may be responsible for parsing the itinerary request to determine nodes associated with the itinerary request and dependencies between the nodes. The node may represent an attribute associated with the itinerary request, such as a city, a flight, a hotel, a date, time, and so forth. The nodes may be combined into an itinerary network.

End-to-End Process Overview

Based on the itinerary request, an itinerary object associated with the itinerary request may be created. The itinerary object, also referred to as an itinerary network object, is a set of data that contains at least one of the following: an itinerary request, an itinerary network created by the parser, structures created by the scheduler (such as an adjacency matrix, a level matrix, and a topology), lists of partitions, itinerary solutions, a passengers list, function calls, and other related items, such as a conversation message and the like. The itinerary network object may be passed to a pre-scheduling process, also referred herein to as a pre-schedule algorithm. Upon creation of the itinerary network, a scheduler may create a level matrix for the itinerary network by selecting main nodes and child nodes that depend on the main nodes. Furthermore, the scheduler may use the pre-schedule algorithm to create a level matrix of the itinerary network. Based on the level matrix, a topology of the itinerary network may be created. In the topology, the nodes are organized in a form of an ordered list.

Using the pre-schedule algorithm a level matrix of nodes and a topology of nodes are created. Based on the topology, the parser can analyze the itinerary network to create tuples associated with the itinerary request. For example, flight tuples and hotel tuples can be created. As used herein, a tuple is a set of objects associated with a node. In an example embodiment, in a topology, a single node may correspond to a single tuple. The parsers use a resource independent scheduling process, also referred to as a resource independent schedule algorithm, to process through the topology one node at a time to create a flight tuple and/or a hotel tuple for a given flight node and/or hotel node. Tuples may not be assigned to city nodes.

Each flight tuple and/or hotel tuple provides date intervals and time intervals to be used in a content search for an itinerary solution (i.e., a flight solution or a hotel solution) for the flight node or the hotel node. In the case of flight tuples, date intervals and/or time intervals may include widebucket intervals. In the case of hotel tuples, date intervals and/or time intervals may include check-in dates, check-in times, checkout dates and check-out times. Flight tuples have an additional optimal bucket interval used for content search and for ranking solutions at a later stage.

Partition

The flight tuples and hotel tuples may then be separated into groups based on the passenger. A partition subset may be determined based on a relation or a property of interest associated with flight tuples. For each passenger, one or more partitions of the flight tuples associated with that passenger may be created.

For each passenger, a single partition of the set of flight tuples into one or more disjoint groups is created, based on a relation or property of interest. The groups are called partition subsets.

Content Search

For each passenger, the following steps may be performed. The content search may be performed based on each hotel tuple, obeying the check-in and checkout dates and times specified in the hotel tuple. The itinerary solutions found based on the content search may be stored in a tuple solution bucket. Then, the content search may be performed separately on each partition subset of the single partition for the passenger. If the subset contains one flight, itinerary solutions for a one-way flight may be returned. If there are two flights in the subset, a priced combination of two flights may be returned. The widebucket date and time intervals from the flight tuples may be obeyed in each search. The solutions may be stored in a partition subset solution bucket.

In parallel, the content search can be performed across all partition subsets for all passengers. For each partition subset, the flight and hotel attributes for the content search may be provided by the tuple time buckets. A set of flight solutions and hotel solutions in compliance with restrictions associated with the itinerary request, such as time restrictions, may be returned and stored for each of the partition subsets. If the only restriction is time, the buckets within the solution fall. A vital aspect of the scheduling is that after the ranking, the scheduling provides the best fitted itinerary solutions for the restrictions placed on the itinerary request. It can be difficult to find results if each time the content search is made and only results that exactly match the restrictions are found. Multi-objective ranking is the mechanism by which providing of the best fitted itinerary solutions is achieved.

Ranking

Ranking of the flight solutions and hotel solutions is performed based on the results of the content search before the flight solutions and hotel solutions are returned to the passenger. Each flight solution and hotel solution is scored against multiple user preferences.

Cartesian Product

For each passenger, the Cartesian product algorithm may create feasible itinerary solutions by combining solutions from the partition subsets and individual hotel tuples correctly into one set. These combined solutions may be ranked.

A solution space for the itinerary is formed by taking the Cartesian product of the sets of solutions for each of the partition subsets. Infeasible combinations of solutions may be removed from a solution list. Furthermore, solutions from the partition subsets and individual hotel tuples can be combined into one set of feasible itinerary solutions and stored in the solution list in the partition for each passenger. The solutions can be ranked and a predetermined number of top solutions can be returned and provided to the passengers via a user interface. It another example embodiment, more than one passenger may be combined into a partition subset.

If same flight dependencies and hotel dependencies exist for different passengers, an itinerary wide Cartesian product algorithm may be performed. Itinerary wide Cartesian product algorithm may combine itinerary solutions from each passenger and rank the itinerary solutions obeying same flight dependencies hotel dependencies, if any exist. The highest ranked itinerary solution may be returned.

Referring to the drawings, FIG. 1 illustrates an environment 100 within which the systems and methods for translating user requests into itinerary solutions can be implemented, in accordance with some embodiments. An itinerary request 120 associated with one or more passengers 130 may be received, for example, via a user interface displayed on a user device 140. In particular, the user device 140, in some example embodiments, may include a Graphical User Interface (GUI) for displaying the user interface associated with a system 800 for translating user requests into itinerary solutions. In a typical GUI, instead of offering only text menus or requiring typed commands, the system 800 may present graphical icons, visual indicators, or special graphical elements called widgets that may be utilized to allow the passengers 130 to interact with the system 800.

The itinerary request 120 may be transmitted to the system 800 for translating user requests into itinerary solutions via a network 110. The network 110 may include the Internet or any other network capable of communicating data between devices. Suitable networks may include or interface with any one or more of, for instance, a local intranet, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or an Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking. The network 110 may be a network of data processing nodes that are interconnected for the purpose of data communication. The network 110 may include any suitable number and type of devices (e.g., routers and switches) for forwarding commands, content, and/or web object requests from each client to the online community application and responses back to the clients.

The user device 140 may include a mobile telephone, a personal computer (PC), a laptop, a smart phone, a tablet PC, and so forth. The system 800 may be a server-based distributed application, thus it may include a central component residing on a server and one or more client applications residing on one or more user devices and communicating with the central component via the network 110. The passengers 130 may communicate with the system 800 via a client application available through the user device 140.

The itinerary request 120 may be analyzed based on travel itineraries available from the optional database 150 with reference to preferences of the passengers 130. An itinerary solution 160 suiting the itinerary request 120 and preferences of the passengers 130 may be determined. The itinerary solution 160 may be presented to the passengers 130 by displaying the itinerary solution 160 via the user interface on a screen of the user device 140.

Figure 2:
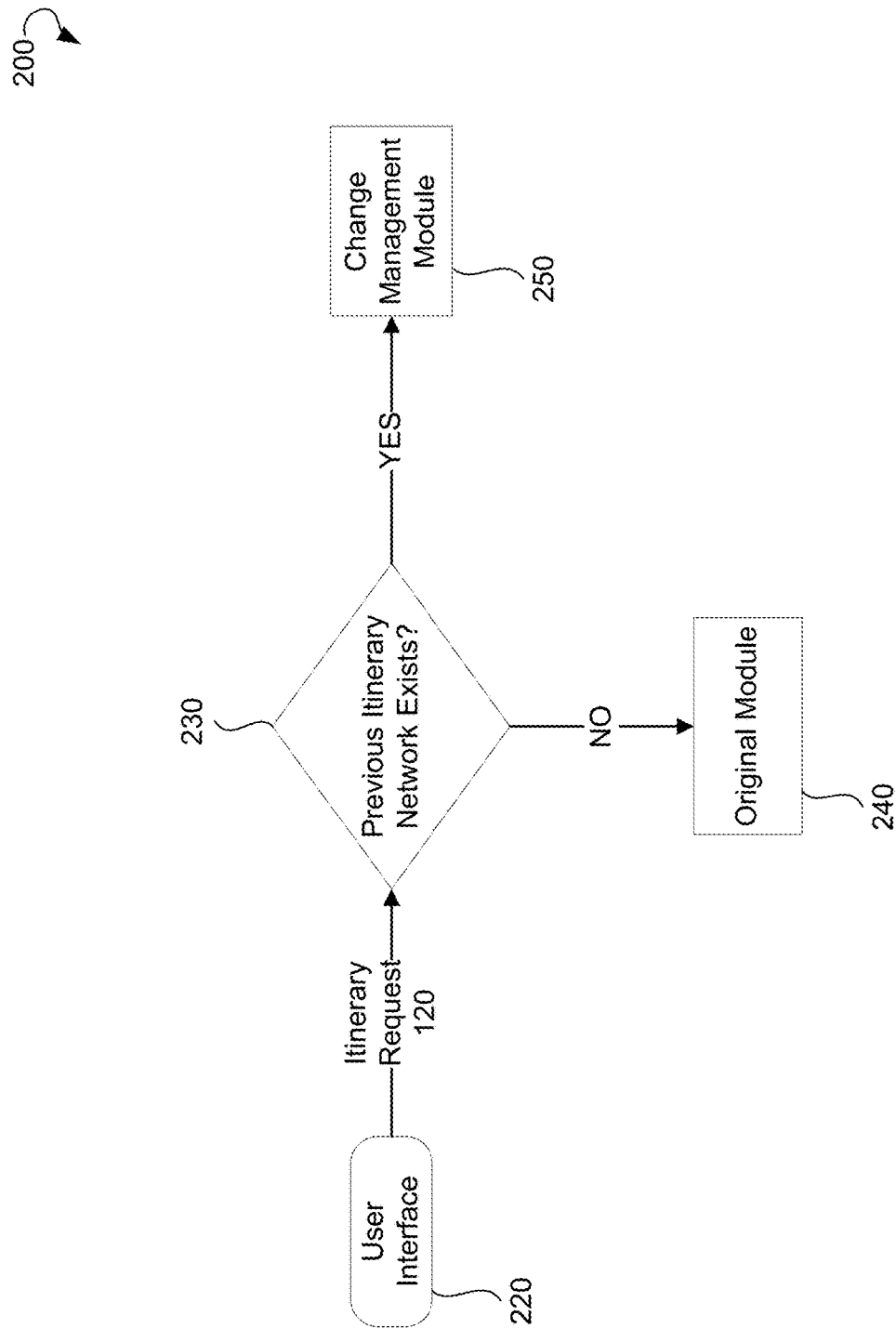
FIG. 2 is a flow diagram showing a process for translating user requests into travel itineraries depending on a previous itinerary network.

FIG. 2 is a flow diagram 200 showing an overall process for translating user requests into travel itineraries depending on a previous itinerary network. More specifically, an itinerary request 120 associated with one or more passengers may be received via a user interface 220. The itinerary request 120 may be processed by an original module 240 or by a change management module 250 depending on whether one or more previous itinerary networks exist for these passengers, as determined at block 230. In an example embodiment, differences between existing itinerary networks and new itinerary networks (if no existing itinerary networks are found) may be resolved by performing an intelligent ranking process.

Figure 3:
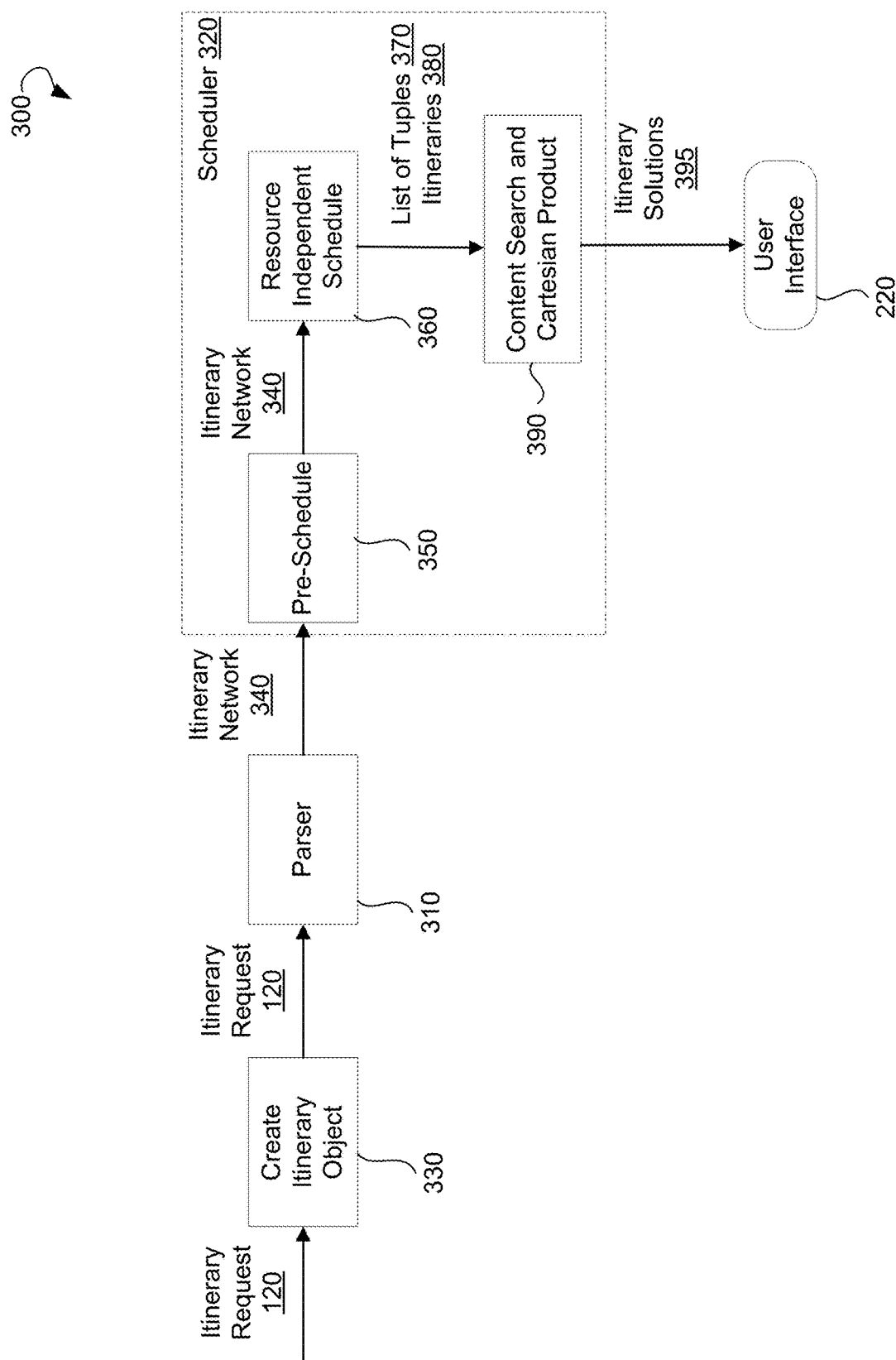
FIG. 3 is a block diagram showing a translation of user requests into travel itineraries via a parser and a scheduler.

FIG. 3 is a schematic block diagram 300 showing translating user requests into travel itineraries by the original module within the environment described with reference to FIG. 1, according to example embodiments. The translation of user requests into travel itineraries is performed by a processor (not shown), a parser 310, a scheduler 320, and a user interface 220. When the processor receives an itinerary request 120 from one or more passengers, an itinerary object may be created at block 330. The itinerary object is a set of data that contains at least the following data: the itinerary request 120, an itinerary network 340 created by the parser 310, structures created by the scheduler 320 (such as an adjacency matrix, a level matrix, and a topology), lists of partitions, itinerary solutions, a passengers list, function calls, and other related items, such as a conversation message and the like. The itinerary object may contain all the information needed for the scheduler 320 and solutions which the scheduler 320 generates. In an example embodiment, a file 'Itinerary.es' may be created to store the itinerary object. Additionally, in relation to command and control, the itinerary object may allow communication between the parser 310 and the scheduler 320.

When the itinerary object is created, the itinerary request 120 and the itinerary object may be forwarded to the parser 310. The parser 310 may create an itinerary network 340 and forward the itinerary network 340 to the scheduler 320. The scheduler 320 analyzes the itinerary network 340, individual passenger profiles, and availability of content. The main processes of the scheduler 320 are pre-scheduled at block 350, followed by forwarding the itinerary network 340 to block 360 for resource-independent scheduling of the itinerary network 340. Upon the resource-independent scheduling, a list 370 of tuples and itineraries 380 are provided to block 390. The tuples may be separated into groups based on the passenger. A partition subset may be determined based on a relation or a property of interest associated with the tuples. For each passenger, one or more partitions of the flight tuples associated with that passenger may be created. A content search may be performed over the partition subset and a Cartesian product may be applied to results of the content search on the partition subsets. Itinerary solutions 395 feasible for the itinerary request 120 may be forwarded to the user interface 220. Steps performed by the parser 310 and the scheduler 320 are described in more detail below with reference to FIGS. 4-7.

Figure 4:
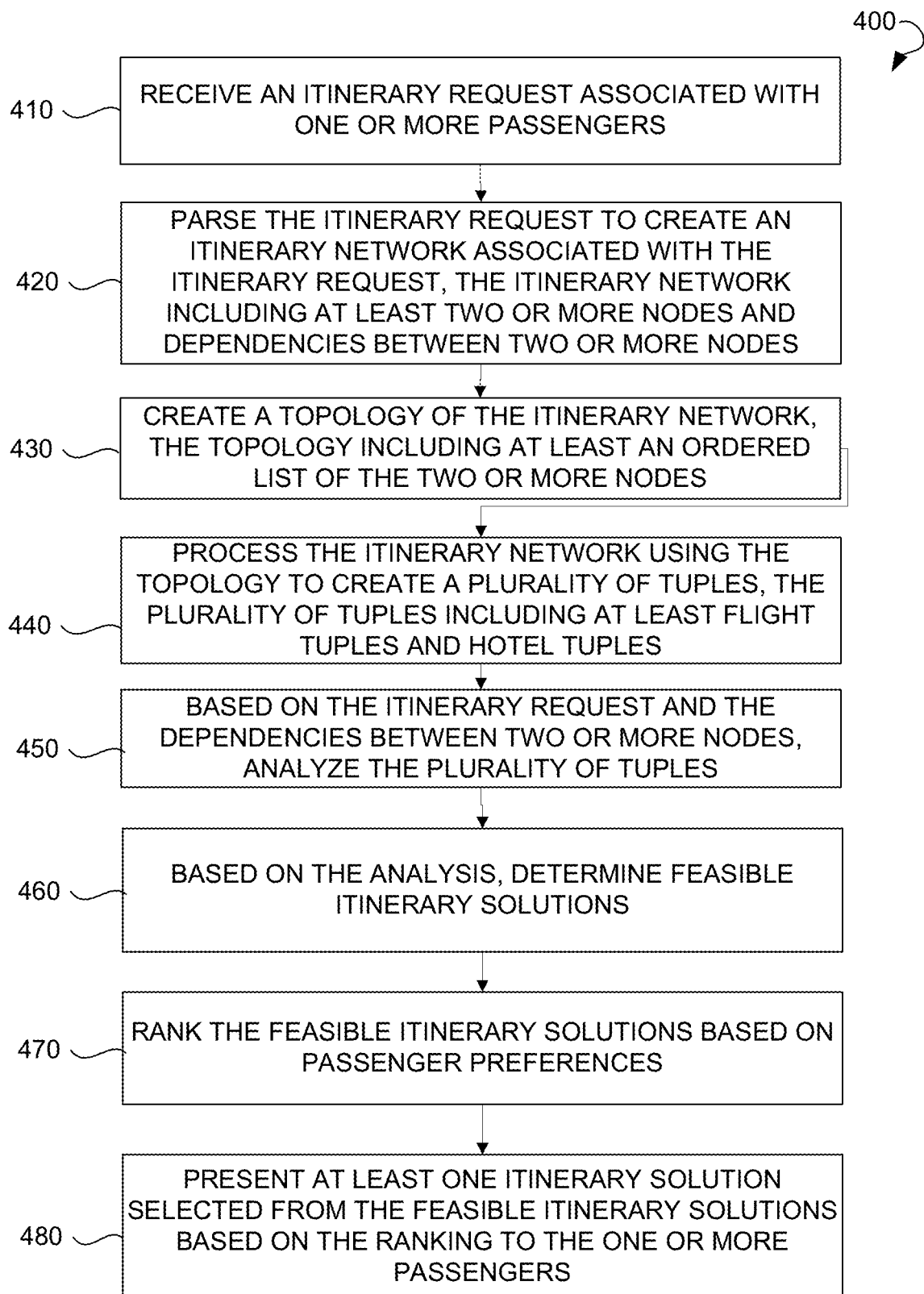
FIG. 4 is a process flow diagram showing a method for translating user requests into itinerary solutions.

FIG. 4 is a detailed process flow diagram showing a method 400 for translating user requests into travel itineraries, according to example embodiments. The method 400 may commence with receiving an itinerary request at operation 410. In an example embodiment, the itinerary request may be provided via at least one of the following: a natural language, a typed text, a selection of preexisting options, and so forth. In a further example embodiment, the itinerary request may be associated with one passenger or a group of passengers. Furthermore, based on the receipt of the itinerary request, an itinerary object associated with the itinerary request may be created.

At step 420, upon receipt of the itinerary request, the parser performs parsing of the itinerary request to create an itinerary network associated with the itinerary request. In an example embodiment, the itinerary network includes a node list, a passenger list, and a dependency list. The node list may contain at least two or more nodes. Each of the nodes represents an attribute, such as a city, a flight, a hotel, and so forth. The dependency list may contain dependencies between two or more nodes, in particular, a directed relation between two nodes, such as a level dependency. In an example embodiment, the node may have additional information concerning an itinerary object that the node represents, such as a passenger or a group of passengers and attributes requested according to the itinerary request, for example, a date, an airline, a hotel brand, and so forth.

The scheduler receives the itinerary network created by the parser. The scheduler is responsible for building of a set of itinerary solutions (e.g., flights, hotels, and so forth), taking into account the structure of the itinerary network, individual passenger profiles, and the availability in content. In particular, the scheduler performs pre-scheduling of the itinerary network, resource independent scheduling of the itinerary network, a content search, and applying a Cartesian product to results of the content search on the partition subsets.

A Pre-Scheduling Process of the Scheduler.

A pre-scheduling process includes creating an adjacency matrix, a level matrix, and a topology.

Adjacency Matrix.

Still referring to FIG. 4, the method 400 may optionally include creating an adjacency matrix of the itinerary network based on the classification of the nodes into main nodes and child nodes. The adjacency matrix is an (n×n) matrix, where n is the number of nodes in the network. Each (i, j) entry has a value of (1) if there is a directed dependency between node i and node j in the network, otherwise, each (i, j) entry has value of (−1) or (0).

Figure 5:
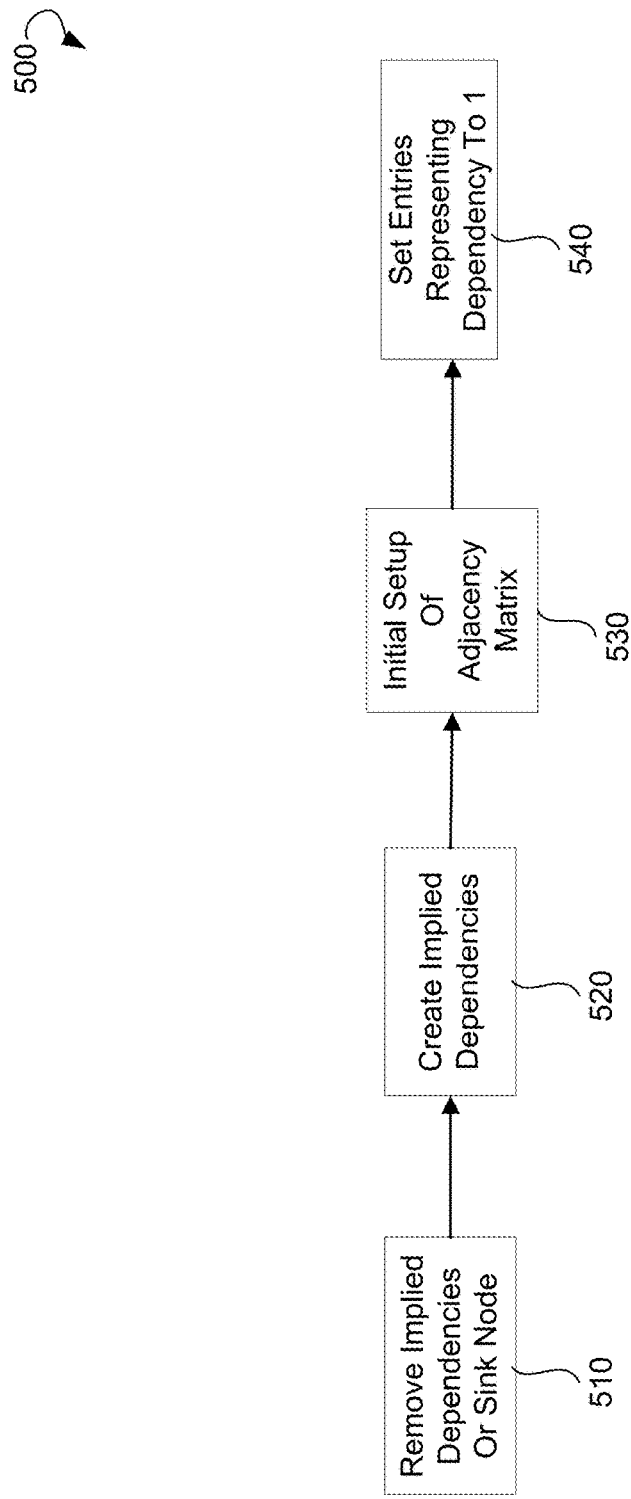
FIG. 5 is block diagram illustrating a process for building an adjacency matrix.

FIG. 5 is a block diagram 500 illustrating a process of building the adjacency matrix. More specifically, at block 510, any implied dependency provided by the parser or a sink node can be removed. At block 520, implied dependencies between the nodes may be created. More specifically, the scheduler may classify each of the nodes into a main node and a child node based on the dependencies between the nodes. The child node is dependent on the main node. Therefore, an implied dependency between a main node and its child node can be created. For example, an implied dependency between a city node being the main node and a hotel node being a child node may be created. The implied dependency may be also created between a flight node which is a main node and a hotel node which is a child node of a destination city. At block 530, an initial setup of the adjacency matrix can be performed. In particular, dimensions (n+2×n+2) can be set, where n is a number of nodes in the itinerary network. The adjacency matrix can be created and all entries initially set to (−1). At block 540, entries that represent dependencies output by the parser and implied dependencies are set to (1).

Level Matrix.

Referring again to FIG. 4, the method 400 may optionally include organizing the nodes into levels to create a level matrix of the itinerary network. In other words, the level matrix, also referred to as a directed acyclic graph matrix, can organize nodes into levels. In an example embodiment, 'Level 0' of the level matrix includes node A and node B, 'Level 1' includes node C, node D, and node E, and 'Level 2' includes node F. The nodes in each level have dependent nodes at the previous level. The nodes in 'Level 0' have no dependencies. The nodes at 'Level 1' have one or more dependent nodes at 'Level 0'. The nodes at 'Level 2' have one or more dependent nodes at 'Level 1', and so forth.

Figure 6:
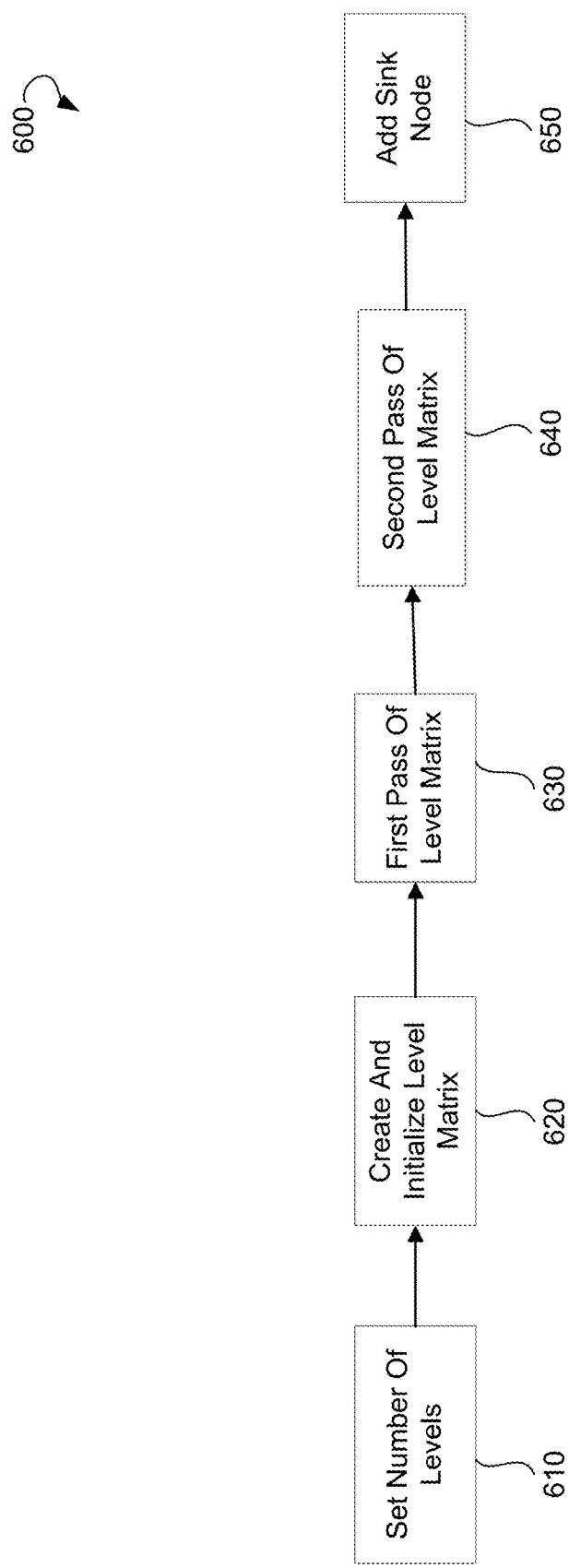
FIG. 6 is a block diagram illustrating a process for building a level matrix.

FIG. 6 is a block diagram 600 illustrating a process of building a level matrix. More specifically, at block 610, a number of levels can be set. In particular, dimensions (n+1×n+1) can be set, where n is number of nodes in the network. The row index may represent the level, the column index may represent the order in which the node was put in. For example, an entry in (i, j) is the index of the node placed in level i in $j^{th}$ place. At block 620, the level matrix may be created and initialized. All entries may be initially set to (−1). At block 630, a first pass of the level matrix may be performed. For this purpose, first, all nodes with no dependencies may be found and placed in level 0. Second, all nodes with dependencies at level 0 may be found and placed in level 1. Successive level nodes may be created until a maximum level is reached. At block 640, a second pass of the level matrix may be performed. In particular, the scheduler may go back through the level matrix and remove duplicate nodes. The nodes in the level matrix may be ordered such that the nodes only appear once and at the latest stage or highest level. Since the level matrix is used for recusing through the nodes, level matrix may ensure that, when performing a forward pass, all dependent nodes for a specific node have already been scheduled, or in the case of the creating of the topology the ordering of the topology also may ensure this condition. At block 650, a sink node may be added.

Topology.

Figure 7:
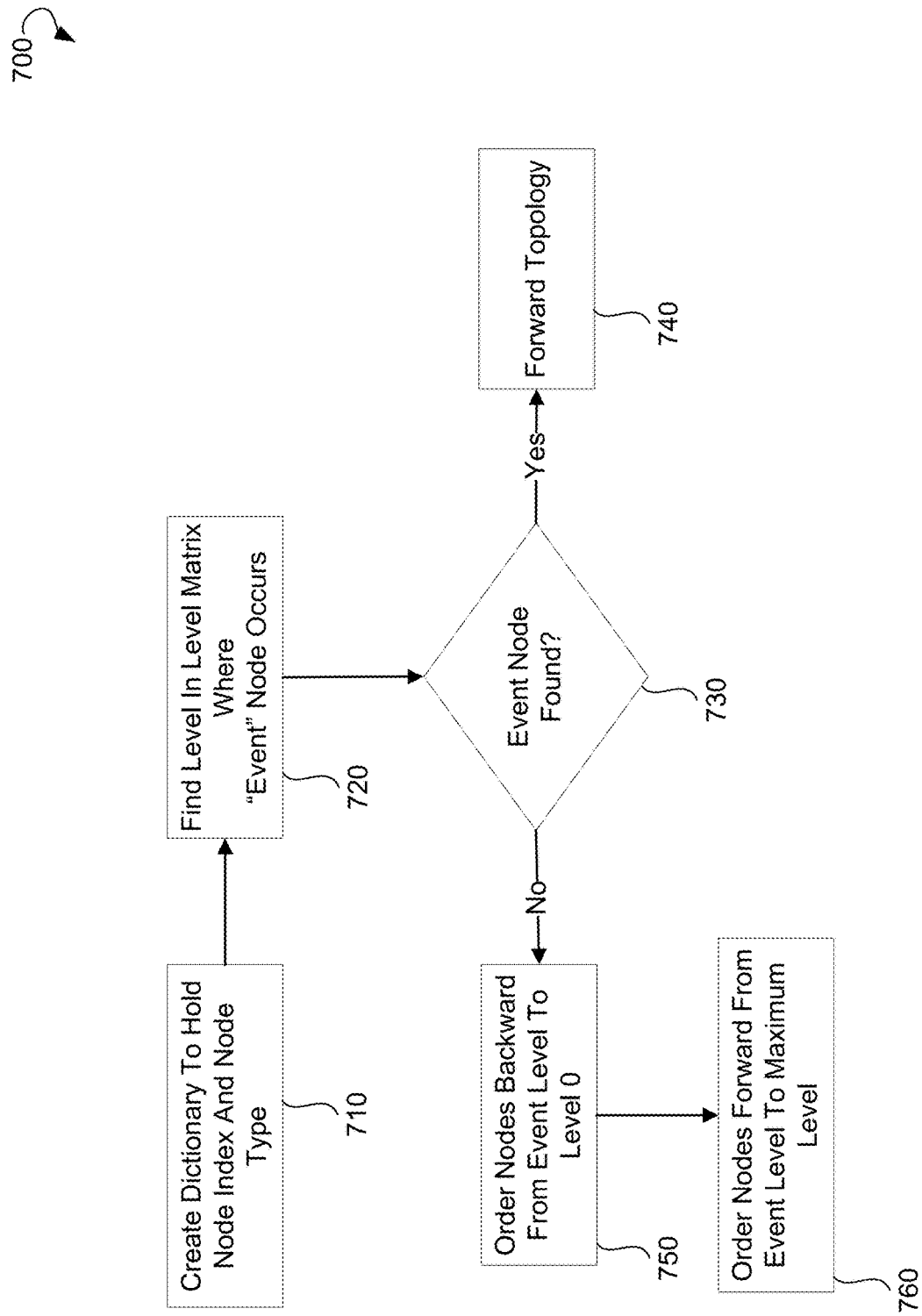
FIG. 7 is a block diagram illustrating a process for creating a topology.

Still referring to FIG. 4, the method 400 may further include operation 430, in which the scheduler may create a topology of the itinerary network. The level matrix provides the basis on which the topology of the itinerary network may be built. The topology is an ordered list of two or more nodes to be scheduled. FIG. 7 is a block diagram 700 illustrating a process for creating the topology. As shown on FIG. 7, at block 710, a dictionary may be created to hold a node index and a node type. At block 720, a level in a level matrix where an event node occurs may be found. If the event node is found at a decision block 730, a forward topology may be created at block 740. In the forward topology, the scheduler may start at level 0 of the level matrix and add the nodes to the topology in the order the nodes occur. This process continues for levels 1 through the maximum level of the level matrix.

In an example embodiment, if level3 denotes the level in the level matrix being considered, k denotes the number of nodes reached at level3, and level3 is set to 0, the following example program code can be used to create the forward topology:

```
while (level3 < maxlevels) do
    Set k = 0
    while (k < levelMatrix.length) do
        Search for next node in level3
        If found add it to topology
        k++
    end
    level3++
end.
```

If the event node is not found at the decision block 730, an event topology may be created. The scheduler may start at level at which the event node is found and add all nodes at that level. Then, for each node at that level, the scheduler may find dependent nodes in the previous level, and add those dependent nodes to the topology. This process is continued backwards through the levels until level 0. Afterwards, the scheduler performs a pass of the forward topology from the first level after the event level. As shown on FIG. 7, at block 750, nodes may be ordered backward from the event level to level 0. At block 760, the nodes may be ordered forward from the event level to the maximum level.

Resource Independent Scheduling Process.

Referring again to FIG. 4, the method 400 may further include processing the itinerary network by the scheduler using the topology to create a plurality of tuples at operation 440. In particular, in an example embodiment, the resource independent scheduling process, or a resource independent schedule algorithm, for each flight node, determines departure and arrival date and time windows, as a function of the itinerary request and the dependencies between two or more nodes in the itinerary network. The departure and arrival date and time windows are used for the content search and ranking of results of the content search. The resource independent scheduling process is also used to also determine check-in and check-out dates for each hotel node in the itinerary network.

The following example program code can be used to determine check-in and check-out dates:

```
ForEach (node n in the topology){
    If ( n is a flight node){
        Set WideBucket Departure and Arrival Windows
        Set OptimalBucket Departure and Arrival Windows
    }
    If ( n is a hotel node){
        Set check-in and check-out dates for the hotel
    }
    If ( n is a city node) {
        Do Nothing
```

The method 400 may further include analyzing the plurality of tuples by the scheduler based on the itinerary request and dependencies between two or more nodes at operation 450. In particular, the resource independent scheduling process may include determining widebucket departure windows, widebucket arrival windows, and optimalbucket windows.

WideBucket Departure Window.

A WideBucket departure window may be used for determining departure windows for the content search. When the resource independent schedule algorithm hits a flight node, the resource independent schedule algorithm may looks for all dependent flight nodes of the flight node in the itinerary network. The dependent nodes may include previous flights of the passenger, or flights from other passenger's itineraries which impact this passenger, for example if they these passengers fly together. The resource independent schedule algorithm then sets the departure window based on the requested date and time and the dependent flights. The resource independent schedule algorithm for determining the widebucket departure window is described in detail below.

Let $F_i$ be a flight node. The departure window for $F_i$ is $[x_{si}, x_{fi}]$ and the arrival window is $[d_{si}, d_{fi}]$. $r_i$ is a requested date and $t_i$ is requested time.

In the first step, the start and end of departure window are initialized to the current date and time (D). $[x_{si}, x_{fi}]=[D,D]$. In the second step, all dependent flight nodes for this flight node are found in the itinerary network. The example program code for these steps may be as follows:

```
foreach (node in nDependencies) do
    switch (NodeType of node) do
        case Flight
            (find a flight tuple corresponding to the node in a list and
            add to Deps if not there already)
        case City
            (find a flight tuple corresponding to a previous flight and
            add to Deps if not there already)
        ;
        case Hotel
            (find a hotel tuple corresponding to the node in a list and
            add to hotel Deps if not there already)
        ;
    endsw
end
```

In the third step, if the set of dependent flights is null, then go to step 4. Else go to step 5. In the fourth step, departure window is set based on requested date and time. The example program code of the coded algorithm is given below:

```
if (Deps = null) then
    if (requested date (r_i) or requested time (t_i) ! = null) then
        if (requested date (r_i) > Today ) then
            [x_si,x_fi] = (12 am r_i, 11:59 pm r_i + Delta)
        end
        if (requested date (r_i) = Today) then
            [x_si,x_fi] = (Now + mct, Now + mct + Delta)
        end
    end
end
```

In the fifth step, the widebucket departure window may be set based on requested date and time, if any. The example program code of the coded algorithm is given below:

```
if (requested date (r_i)! = null) then
    (start, finish) = (r_i at 12 am, r_i + Delta at 11:59 pm)
end
```

Start and finish variables are updated based on arrival windows of dependent flights. Basically, start is set to be maximum start and finish is set to be minimum finish of all arrival windows (where finish>start). The example program code of the coded algorithm is given below:

```
foreach (FlightTuple t in Deps) do
        Let start_t and end_t denote the start and end of widebucket arrival
            window,
            respectively
        if (start_t > start) then
            start = start_t
        end
        if (end_t < finish AND end_t > start) then
            finish = end_t
        end
end
foreach (HotelTuple t in Deps) do
        if (t.checkout date > start) then
            start =t.checkout date
        end
        if (t.checkout date < finish AND t.checkout date > start) then
            finish = t.checkout date
        end
end
```

If the requested date ($r_i$) falls significantly outside the interval (start, finish), the scheduler may build the departure window on $r_i$. Otherwise, [$x_{st}, x_{fi}$] is equal to (start+mct, finish+mct+Delta).

WideBucket Arrival Window.

The shortest and longest flying times are determined for the flight $F_{i}$. The shortest and longest flying time may be $fly_{s}$, and the longest flying time may be $fly_{l}$. Thereafter, the time zone difference, diff, is determined. The time zone difference is an integer number (e.g., number of minutes) depending on regions of departure and arrival airports. Based on the combining, the arrival window may be ($x_{st}$+$fly_{s}$+diff, $x_{fi}$+$fly_{l}$+diff).

OptimalBucket Window.

The optimal flight departure window or the optimal flight arrival window (or both) is essentially a narrower time window for when the passenger wants to fly, based on dates and times requested in the itinerary request. Flights found in larger window may be ranked based on whether a flight fits into this narrower window. This process is similar to creation of the flight windows created earlier, with the following difference: if a flight cannot be found in a preferred window, reasonable flights falling outside the optimal window still can be obtain. In conventional methods, these reasonable flights are missed and an empty solution is provided.

The wide departure window may be determined as [$wd_{st}$, $wd_{fi}$], the wide arrival window may be determined as [$wa_{st}$, $wa_{fi}$], the narrow departure window may be determined as [$nd_{st}$, $nd_{fi}$], and the narrow arrival window may be determined as [$na_{st}$, $na_{fi}$].

The algorithm for determining the optimalbucket windows may include obtaining wider flight windows (departure and arrival):

Set [$nd_{st}$, $nd_{fi}$] $=$ [$wd_{st}$, $wd_{fi}$] initially.

The wider flight windows may be switched based on a type of the itinerary request. Intervals may be handled by going through departure before x1 and departure after x2 separately. Similar steps are performed for arrival intervals:

(a) Depart on x
check that $nd_{st} < x < nd_{fi}$
($nd_{st}$, $nd_{fi}$)=[$nd_{st}$, x]
(b) Depart Before x
check that $nd_{st} < x < nd_{fi}$
($nd_{st}$, $nd_{fi}$)=[$nd_{st}$, x]
(c) Depart after x
check that $nd_{st} < x < nd_{fi}$
($nd_{st}$, $nd_{fi}$)=[$nd_{st}$, x]
(d) Arrive on x
check that $na_{st} < x < na_{fi}$
($na_{st}$, $na_{fi}$)=[$na_{st}$, x]
(e) Arrive Before x
check that $na_{st} < x < na_{fi}$
($na_{st}$, $na_{fi}$)=[$na_{st}$, x]
(f) Arrive after x
check that $na_{st} < x < na_{fi}$
($na_{st}$, $na_{fi}$)=[x, $na_{fi}$]
Partition Algorithm.

The following program code may be used for initiating the partition algorithm, Cartesian product algorithm, and content search:

```
foreach (Passenger) do
        Partition Algorithm
end
Content Search
        Ranking Partition Subset Solutions
foreach (Passenger) do
        Cartesian Product Algorithm
end
```

The partition algorithm, Cartesian product algorithm, and ranking are described in more detail below.

The partition refers to groupings of flight tuples. More specifically, the method 400 can include selecting a partition of the flight tuples for each passenger. Hotel tuples are not part of the partition. There is a possibility to perform more than one partition. Input data for a partition algorithm may include a level matrix. Output data of the partition algorithm is a combination of partitions of flight tuples and/or individual flight tuples. Let Ti is a trip, such as a trip by plane, train, and so forth. Using a depth-first search (DFS) algorithm to find cycles may miss combinations of the form (YYZ-LHR, CDG-YYZ) and (LHR-CDG) corresponding to (T1, T3) and (T2). This may be caused by the fact that DFS follows the path and includes LHR-CDG in the path when creating the cycle. Therefore, the DFS algorithm may produce YYZ-LHR-CDG-YYZ->(T1, T2, T3).

In example embodiments, other ways of finding potential return combinations of partitions of flight tuples that are not path dependent may be used.

Example Partition Algorithm 1.

Two flight nodes Fi and Fj may be related as follows: Fi origin city=Fj destination city. This relation may be not an equivalence relation since the relation is not symmetric. However, the relation can partition the main set into meaningful subsets based on potential cycles. The input data for the partition algorithm may include a list of flight nodes. The output data may include a list of subsets of flight nodes. During execution of the partition algorithm, a list of subsets may be defined and called PartitionSubsets. Furthermore, the number of flight nodes may be counted. In an example embodiments, the following program code may be used for this purpose:

```
for (int i = 0; i < Count; i++) do
    for (int j = 0; j < Count; j++) do
        if (i < j) then
            if (Fi.origin city - Fj.destination city) then
                if there is a set in PartitionSubsets containing Fi or Fj (but
                not both) then add Fi or Fj to this set
                if no such set then create a new set, add Fi and Fj to the
                new set.
                Add set to PartitionSubsets
            end
        end
    end
end
```

For any flight nodes not added to a set, single flight sets may be created and added to PartitionSubsets.

The partition algorithm may produce the same result as creating a graph whose nodes are trips Ti and with edges between two trips if origin city of one trip is equal to destination city of another trip. The new set to be partitioned may consist of disjoint connected components of the graph, which are the PartitionSubsets in the partition algorithm described above.

Example Partition Algorithm 2.

Execution of the partition algorithm may include finding all pairs of trips where origin of the first trip is the same as destination of the second trip. Furthermore, all disjoint combinations of pairs of trips may be found. The leftover trips not in pairs may be added. Thereby, one or more modified sets may be obtained, where pairs of trips are treated as a single element. Furthermore, all partitions for each modified set may be found. Finally, edge cases may be added.

Cartesian Product Algorithm.

The Cartesian product algorithm, also referred herein to as a Heuristic algorithm, may combine solutions across the partition subsets and hotel solutions to form a complete flight (and hotel) solution for the passenger. The Cartesian product algorithm may include taking a cross product of solutions across the partition subset solution buckets for flights (A×B×C). Furthermore, each solution obtained may be checked for correctness (e.g., one flight does not depart before a previous dependent flight arrives). These operations are illustrated in FIG. 4, namely the method 400 may include determining feasible itinerary solutions by the scheduler based on the analysis at operation 460. The feasible solutions may be stored in a partition solution bucket. The Cartesian product algorithm may further include taking a cross product of full solutions with a list of hotel solutions to combine flights and hotels correctly.

As shown in FIG. 4, at operation 470, the feasible itinerary solutions may be ranked based on passenger preferences. In an example embodiment, the passenger preferences are determined based on the itinerary request or a preexisting selection. More specifically, upon execution of the Cartesian product algorithm, the ranking is applied to feasible solutions provided by Cartesian product algorithm. A predetermined number of the top itinerary solutions may be selected. If identical dependencies associated with each of the passengers are identified, such as the same flight and hotel dependencies among the passengers, an itinerary wide Cartesian product algorithm may be initiated across the partition solutions and the feasible solutions may be ranked based on the identical dependencies. In some example embodiments, a conventional ranking procedure may be performed. At operation 480, at least one itinerary solution selected from the feasible itinerary solutions based on the ranking may be presented to the one or more passengers.

Change Management Module.

Changes to an existing itinerary network can take almost any direction: from changes to the resultant itinerary network to date and time change, adding companions to the itinerary or removing companions of the itineraries.

Change management of the itinerary network is handled by the change management module using the following steps.

First, a new itinerary network may be generated by the parser. This new itinerary network may be typically created by making changes to an existing itinerary network.

Second, the scheduler may generate a new Cartesian product solution by going through the steps of pre-scheduling, resource independent scheduling, partitioning, content searches and Cartesian product, as may be suitable for the new itinerary network. The Cartesian product may be performed on the new itinerary network independently from the existing itinerary network or sets of itinerary solutions associated with the existing itinerary network.

Third, previously booked flights and hotels, if it is deemed suitable to retain the flights and hotels, may be given additional scores where flights and hotels form part of the new Cartesian product solution for the new itinerary network. In this manner, they the flights and hotels may naturally be a part of a solution space of the new itinerary network. In an example embodiment, inclusion of previously booked flights and hotels may be congruent, in other example embodiments, inclusion of previously booked flights and hotels may be not congruent.

As a result of selection of a member of the Cartesian product as the itinerary solution, one or more of the following functions may occur: (a) new partitions may be created; (b) some old partitions may be retained; and (c) old partitions may be deleted (i.e., cancelled).

The overall process performed by the change management module is similar to the process performed by the original module. The operations are performed by the parser and the scheduler (pre-scheduling, resource independent scheduling, and content search). The operation of the change management module is described with reference to one passenger, however, a plurality of passengers also may be analyzed by the change management module.

The parser may receive an itinerary request from a passenger and identify a preexisting itinerary network associated with the passenger. The preexisting itinerary network may be associated with one or more previous itinerary requests associated with the passenger. The input data for the change management module may include a previous itinerary that may include a partition $P_{old}$ associated with the previous itinerary and a booked solution (denoted as bookedSolutions). The input data may further include an itinerary object associated with a new itinerary request received by the change management module. The process performed by the change management module may include running the resource independent scheduling to create time windows for flights and hotels in a new itinerary network (as in the process performed by the original module). The process may further include running a partition algorithm to create a partition for the new network $P_{new}$. The process may continue with running a content search to fill itinerary solution buckets for partition subsets of $P_{new}$. The content search may be unrestricted by the booked old itinerary solution at this stage. The process may further include running a Cartesian product algorithm to obtain feasible itinerary solutions for the new itinerary network. Based on the feasible itinerary solutions, the preexisting itinerary network may be updated for further use during processing of further itinerary requests.

The following code can be used to perform these operations:

```
foreach (Solution in CartesianProduct) do
    foreach (Flight in solution.Flights) do
        If a flight exists in Booked Solution, then add one to
        ChangeManagementRank field of the solution
        Else Do Nothing
    end
end
```

In example embodiment, the ranking may be combined with conventional ranking operations. Different types of ranking may have an equal weight or a predetermined weight in a combined ranking. Finally, the solutions may be scored and ranked based on the score.

Figure 8:
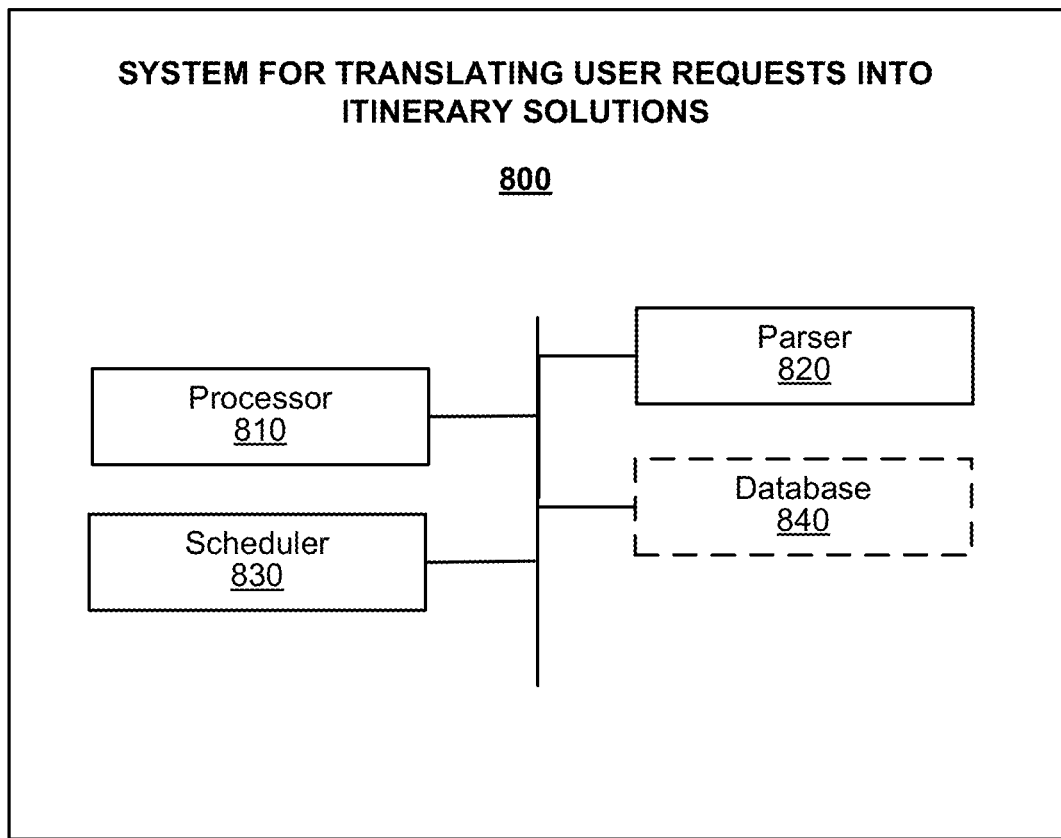
FIG. 8 is a block diagram showing various modules of a system for translating user requests into itinerary solutions.

FIG. 8 is a block diagram showing various modules of the system 800 for translating user requests into itinerary solutions, in accordance with certain embodiments. The system 800 may include a processor 810, a parser 820, a scheduler 830, and an optional database 840. The processor 810 may include a programmable processor, such as a microcontroller, central processing unit (CPU), and so forth. In other embodiments, the processor 810 may include an application-specific integrated circuit or programmable logic array, such as a field programmable gate array designed to implement the functions performed by the system 800.

The processor 810 may be operable to receive an itinerary request associated with one or more passengers. The parser 820, being in communication with the processor 810, may be operable to parse the itinerary request to create an itinerary network associated with the itinerary request. The itinerary network may include at least two or more nodes and dependencies between two or more nodes. The two or more nodes may be selected from a group comprising: an origin city, a destination city, a hotel, a date, a time, an airline, a connection between flights, and so forth.

In example embodiments, the scheduler 830, being in communication with the processor 810 and the parser 820, may be further operable to organize the two or more nodes into levels based on the dependencies between two or more nodes to create a level matrix of the itinerary network. Therefore, the dependencies between two or more nodes may include at least level dependencies. The scheduler 830 may also create a topology of the itinerary network that may include at least an ordered list of the two or more nodes. The topology of the itinerary network may be created based on the level matrix. In further example embodiments, the scheduler 830 may be operable to classify each of the nodes into a main node and a child node based on the dependencies between the nodes. The child node may be dependent on the main node.

Thereafter, the scheduler 830 may be operable to process the itinerary network using the topology to create a plurality of tuple, such as flight tuples and hotel tuples. In an example embodiment, the flight tuples may include at least a departure date, a departure time, an arrival date, and an arrival time. The hotel tuples may include at least a check-in date, a check-in time, a check-out date, and a check-out time.

The scheduler 830 may be further operable to analyze the plurality of tuples based on the itinerary request and the dependencies between two or more nodes. In an example embodiment, the analysis may include separation of the plurality of tuples into groups. Each group may correspond to one of the passengers. Furthermore, a partition of the flight tuples may be selected for each of the one or more passengers.

Based on the analysis, the scheduler 830 may be operable to determine feasible itinerary solutions. In particular, based on the hotel tuples and the partition of the flight tuples, a content search may be performed to determine the feasible itinerary solutions for each of the one or more passengers. The feasible itinerary solutions may be ranked by the scheduler 830 based on passenger preferences. In an example embodiment, the passenger preferences are determined based on the itinerary request or a preexisting selection. The scheduler 830 may further identify identical dependencies associated with each of the one or more passengers based on the dependencies between two or more nodes. In this embodiment, the ranking may be further based on the identical dependencies.

The processor 810 may be further operable to present at least one itinerary solution to the one or more passengers. The at least one itinerary solution may be selected from the feasible itinerary solutions based on the ranking.

In some example embodiments, the parser 820 may be further operable to identify a preexisting itinerary network associated with the passengers. In particular, the preexisting itinerary network may be associated with previous itinerary requests associated with the passengers. Upon identification of the preexisting itinerary network, the parser 820 may update the preexisting itinerary network based on the feasible itinerary solutions selected in response to the itinerary request of the passenger.

Figure 9:
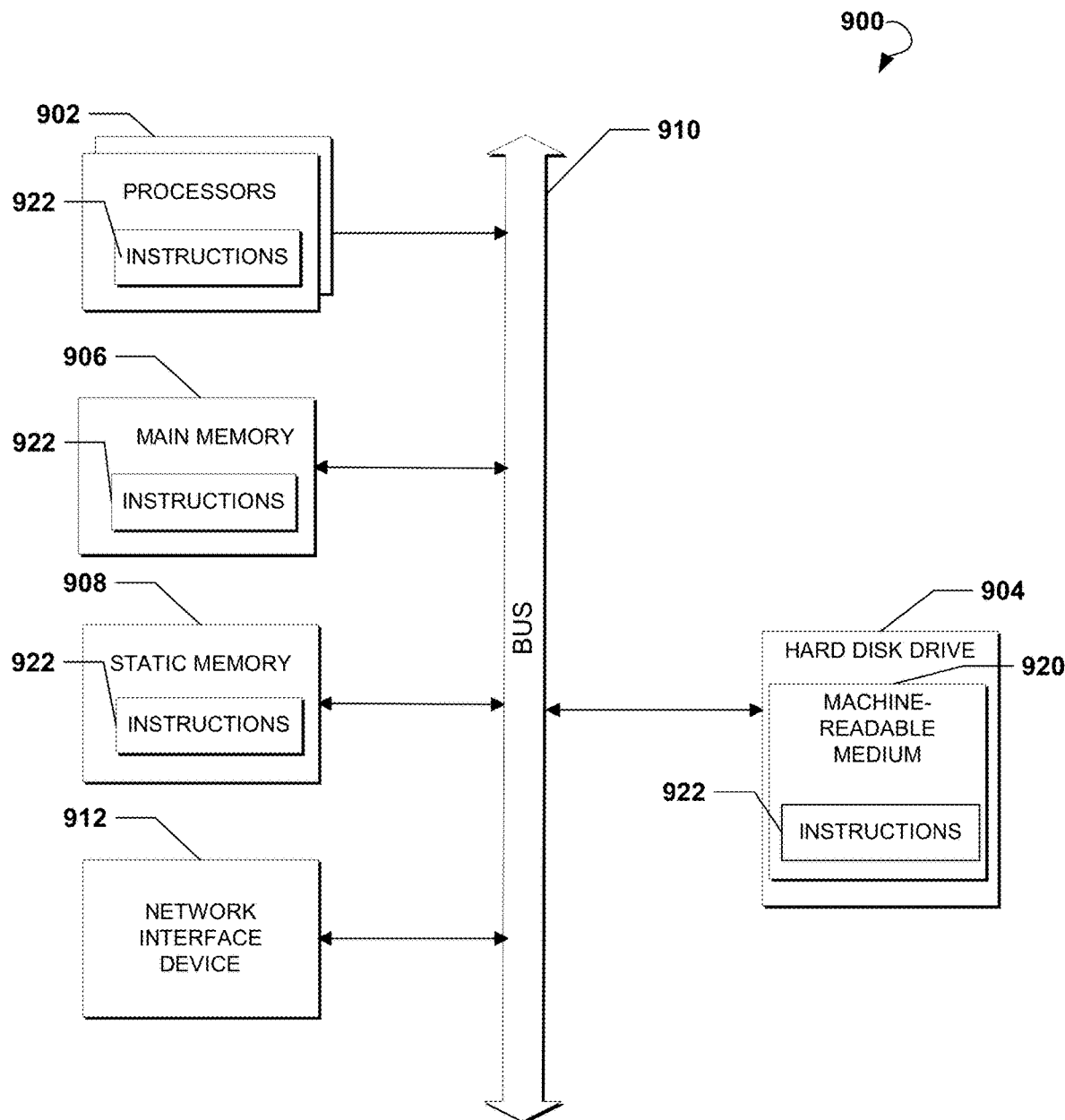
FIG. 9 shows a diagrammatic representation of a computing device for a machine in the exemplary electronic form of a computer system, within which a set of instructions for causing the machine to perform any one or more of the methodologies discussed herein can be executed.

FIG. 9 shows a diagrammatic representation of a computing device for a machine in the exemplary electronic form of a computer system 900, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box, a cellular telephone, a digital camera, a portable music player (e.g., a portable hard drive audio device, such as an Moving Picture Experts Group Audio Layer 3 player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 900 includes a processor or multiple processors 902, a hard disk drive 904, a main memory 906, and a static memory 908, which communicate with each other via a bus 910. The computer system 900 may also include a network interface device 912. The hard disk drive 904 may include a computer-readable medium 920, which stores one or more sets of instructions 922 embodying or utilized by any one or more of the methodologies or functions described herein. The instructions 922 can also reside, completely or at least partially, within the main memory 906 and/or within the processors 902 during execution thereof by the computer system 900. The main memory 906 and the processors 902 also constitute machine-readable media.

While the computer-readable medium 920 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, Random Access Memory (RAM), Read-Only Memory (ROM), and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems.

In some embodiments, the computer system 900 may be implemented as a cloud-based computing environment, such as a virtual machine operating within a computing cloud. In other embodiments, the computer system 900 may itself include a cloud-based computing environment, where the functionalities of the computer system 900 are executed in a distributed fashion. Thus, the computer system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as a client device, with each server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk, any other optical medium, any other physical medium with patterns of marks or holes, a RAM, a Programmable Read-Only Memory, an Erasable Programmable Read-Only Memory (EPROM), an Electrically Erasable Programmable Read-Only Memory, a FlashEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present technology has been presented for purposes of illustration and description, but is not intended to be exhaustive or limited to the disclosure. Many modifications and variations will be apparent to those of ordinary skill in the art without departing from the scope and spirit of the disclosure. Exemplary embodiments were chosen and described in order to best explain the principles of the present technology and its practical application, and to enable others of ordinary skill in the art to understand the disclosure for various embodiments with various modifications as are suited to the particular use contemplated.

Aspects of the present technology are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, computer-implemented methods and systems for translating user requests into itinerary solutions are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for translating user requests into itinerary solutions, the system comprising:
   a processor; and
   a memory coupled to the processor, the memory storing instruction executable by the memory to perform a method comprising:
   receiving an itinerary request associated with one or more passengers;
   determining at least two nodes associated with the itinerary request and dependencies between the at least two nodes;
   combining the at least two nodes into an itinerary network;
   creating a level matrix for the itinerary network by selecting main nodes from the at least two nodes in the itinerary network and child nodes that depend on the main nodes;
   constructing a topology of the itinerary network using the level matrix, the topology including an ordered list of the at least two nodes;
   producing a plurality of tuples using the topology, the plurality of tuples including at least flight tuples and hotel tuples, each tuple of the plurality of tuples being a set of objects associated with a node of the at least two nodes;
   ascertaining respective feasible itinerary solutions for the one or more passengers using the plurality of tuples and the dependencies between the at least two nodes;
   ranking the respective feasible itinerary solutions using passenger preferences; and
   presenting, to at least one of the one or more passengers, a respective itinerary solution of the respective feasible itinerary solutions using the ranking.

2. The system of claim 1, wherein the flight tuples include at least a departure date, a departure time, an arrival date, and an arrival time, and the hotel tuples include at least a check-in date, a check-in time, a check-out date, and a check-out time.

3. The system of claim 1, wherein the method further comprises generating an adjacency matrix of the itinerary network using a classification of the main nodes and the child nodes from the at least two nodes of the itinerary network.

4. The system of claim 1, wherein the method further comprises:
   separating the plurality of tuples into groups, each group corresponding to one of the one or more passengers;
   selecting a partition of the flight tuples for each of the one or more passengers; and
   finding the respective feasible itinerary solutions using a content search of the hotel tuples and the partition of the flight tuples.

5. The system of claim 1, wherein the method further comprises identifying identical dependencies associated with each of the one or more passengers using the dependencies between at least two nodes, and the ranking further uses the identical dependencies.

6. The system of claim 1, wherein the passenger preferences are determined using at least one of the itinerary request and a preexisting selection for the one or more passengers from a previous itinerary request.

7. The system of claim 1, wherein the method further comprises:
   identifying a preexisting itinerary network associated with the one or more passengers, the preexisting itinerary network being associated with one or more previous itinerary requests associated with the one or more passengers; and
   updating the preexisting itinerary network using the feasible itinerary solutions.

8. The system of claim 1, wherein the dependencies between at least two nodes include at least level dependencies.

9. The system of claim 1, wherein the at least two nodes are selected from a group comprising: an origin city, a destination city, a hotel, a date, a time, an airline, and a connection between flights.

10. The system of claim 1, wherein the method further comprises retrieving the passenger preferences from a data store.

11. A computer-implemented method for translating user requests into itinerary solutions, the method comprising:
    a processor; and
    a memory coupled to the processor, the memory storing instruction executable by the memory to perform a method comprising:
    receiving an itinerary request associated with one or more passengers;
    determining at least two nodes associated with the itinerary request and dependencies between the at least two nodes;
    combining the at least two nodes into an itinerary network;
    creating a level matrix for the itinerary network by selecting main nodes from the at least two nodes in the itinerary network and child nodes that depend on the main nodes;
    constructing a topology of the itinerary network using the level matrix, the topology including an ordered list of the at least two nodes;
    producing a plurality of tuples using the topology, the plurality of tuples including at least flight tuples and hotel tuples, each tuple of the plurality of tuples being a set of objects associated with a node of the at least two nodes;

ascertaining respective feasible itinerary solutions for the one or more passengers using the plurality of tuples and the dependencies between the at least two nodes;

ranking the respective feasible itinerary solutions using passenger preferences; and presenting, to at least one of the one or more passengers, a respective itinerary solution of the respective feasible itinerary solutions using the ranking.

12. The computer-implemented method of claim 11, wherein the flight tuples include at least a departure date, a departure time, an arrival date, and an arrival time, and the hotel tuples include at least a check-in date, a check-in time, a check-out date, and a check-out time.

13. The computer-implemented method of claim 11 further comprising generating an adjacency matrix of the itinerary network using a classification of the main nodes and the child nodes from the at least two nodes of the itinerary network.

14. The computer-implemented method of claim 11 further comprising:

separating the plurality of tuples into groups, each group corresponding to one of the one or more passengers;

selecting a partition of the flight tuples for each of the one or more passengers; and finding the respective feasible itinerary solutions using a content search of the hotel tuples and the partition of the flight tuples.

15. The computer-implemented method of claim 11 further comprising identifying identical dependencies associated with each of the one or more passengers using the dependencies between at least two nodes, and the ranking further uses the identical dependencies.

16. The computer-implemented method of claim 11, wherein the passenger preferences are determined using at least one of the itinerary request and a preexisting selection for the one or more passengers from a previous itinerary request.

17. The computer-implemented method of claim 11 further comprising:

identifying a preexisting itinerary network associated with the one or more passengers, the preexisting itinerary network being associated with one or more previous itinerary requests associated with the one or more passengers; and updating the preexisting itinerary network using the feasible itinerary solutions.

18. The computer-implemented method of claim 11, wherein the dependencies between at least two nodes include at least level dependencies.

19. The computer-implemented method of claim 11, wherein the at least two nodes are selected from a group comprising: an origin city, a destination city, a hotel, a date, a time, an airline, and a connection between flights.

* * * * *